(12) United States Patent
Damian

(10) Patent No.: US 11,494,058 B1
(45) Date of Patent: Nov. 8, 2022

(54) INTERACTIVE METHODS AND SYSTEMS FOR EXPLORING IDEOLOGY ATTRIBUTES ON A VIRTUAL MAP

(71) Applicant: George Damian, Wesley Chapel, FL (US)

(72) Inventor: George Damian, Wesley Chapel, FL (US)

(*) Notice: Subject to any disclaimer, the term of this patent is extended or adjusted under 35 U.S.C. 154(b) by 0 days.

(21) Appl. No.: 17/087,532

(22) Filed: Nov. 2, 2020

Related U.S. Application Data

(60) Provisional application No. 63/074,276, filed on Sep. 3, 2020.

(51) Int. Cl.
| | |
|---|---|
| *G06F 3/0484* | (2022.01) |
| *G06T 11/00* | (2006.01) |
| *G06Q 20/12* | (2012.01) |
| *G06Q 30/00* | (2012.01) |
| *G06Q 50/26* | (2012.01) |
| *G06Q 30/02* | (2012.01) |
| *G06Q 50/00* | (2012.01) |
| *G09B 29/00* | (2006.01) |
| *G06Q 10/10* | (2012.01) |
| *G06F 3/048* | (2013.01) |

(52) U.S. Cl.
CPC .......... *G06F 3/0484* (2013.01); *G06Q 10/10* (2013.01); *G06Q 20/1235* (2013.01); *G06Q 30/0185* (2013.01); *G06Q 30/0205* (2013.01); *G06Q 50/01* (2013.01); *G06Q 50/26* (2013.01); *G06T 11/001* (2013.01); *G09B 29/006* (2013.01); *G06T 2200/24* (2013.01)

(58) Field of Classification Search
CPC ..... G06F 3/0482; G06F 3/0484; G06Q 10/10; G06Q 20/1235; G06Q 30/0185; G06Q 30/0205; G06Q 50/01; G06Q 50/26; G06T 11/001; G06T 2200/24; G09B 29/006
See application file for complete search history.

(56) References Cited

U.S. PATENT DOCUMENTS

| | | | | |
|---|---|---|---|---|
| 5,850,531 A | * | 12/1998 | Cox | ..... G06F 3/04847 715/764 |
| 6,101,496 A | * | 8/2000 | Esposito | ..... G01C 21/32 707/999.005 |
| 6,144,962 A | * | 11/2000 | Weinberg | ..... G06F 11/32 714/E11.181 |

(Continued)

*Primary Examiner* — Nicholas Augustine
(74) *Attorney, Agent, or Firm* — Kanika Radhakrishnan; Evergreen Valley Law Group

(57) ABSTRACT

Embodiments provide interactive methods and systems for exploring ideologies on a virtual map. Method performed by a processor of an ideology exploration system includes displaying an interactive map comprising a plurality of regions on a UI in an electronic device for a user. Each region is associated with at least one ideology attribute. Each region includes media items associated with the ideology attribute. The method includes facilitating a virtual tool for the user for navigating from one region to another region based on a user preference. The user preference includes actions performed by the user on regions for exploring the regions. The method also includes tracking a user identifier associated with the user based on the user preference to determine a journey of the user. The method further includes updating a status of the user on a user profile based on the journey of the user in the interactive map.

20 Claims, 18 Drawing Sheets

(56) References Cited

U.S. PATENT DOCUMENTS

| | | | |
|---|---|---|---|
| 6,678,615 B2* | 1/2004 | Howard | G06Q 10/06 |
| | | | 701/532 |
| 7,089,266 B2* | 8/2006 | Stolte | G06F 3/04842 |
| | | | 707/999.102 |
| 7,292,243 B1* | 11/2007 | Burke | G09B 5/00 |
| | | | 715/764 |
| 8,237,714 B1* | 8/2012 | Burke | G06T 11/206 |
| | | | 715/764 |
| 9,348,881 B1* | 5/2016 | Hao | G06F 16/00 |
| 9,892,109 B2 | 2/2018 | Myslinski | |
| 2004/0078143 A1* | 4/2004 | Howard | G06Q 10/06 |
| | | | 702/5 |
| 2004/0243593 A1* | 12/2004 | Stolte | G06F 16/282 |
| 2005/0073096 A1 | 4/2005 | Reynolds | |
| 2006/0100912 A1* | 5/2006 | Kumar | G06F 16/951 |
| | | | 705/4 |
| 2006/0206512 A1* | 9/2006 | Hanrahan | G06T 11/206 |
| | | | 707/999.102 |
| 2007/0211056 A1* | 9/2007 | Chakraborty | G06T 11/206 |
| | | | 345/440 |
| 2007/0245238 A1* | 10/2007 | Fugitt | G06F 3/0481 |
| | | | 715/700 |
| 2008/0065634 A1* | 3/2008 | Krinsky | G06F 16/9535 |
| | | | 707/999.102 |
| 2008/0163085 A1* | 7/2008 | Subbu | G06F 9/451 |
| | | | 715/763 |
| 2008/0243785 A1* | 10/2008 | Stading | G06F 16/9535 |
| 2012/0150590 A1 | 6/2012 | Liebermann | |
| 2012/0290950 A1* | 11/2012 | Rapaport | H04L 67/306 |
| | | | 715/753 |
| 2013/0073473 A1* | 3/2013 | Heath | G06Q 30/0241 |
| | | | 705/319 |
| 2013/0218463 A1* | 8/2013 | Howard | G06Q 30/0641 |
| | | | 701/533 |
| 2015/0106170 A1* | 4/2015 | Bon | G06F 16/24578 |
| | | | 705/12 |
| 2019/0146965 A1* | 5/2019 | Zack | G06F 16/24578 |
| | | | 707/690 |
| 2019/0066246 A1 | 8/2019 | David | |
| 2020/0314126 A1* | 10/2020 | Schmugar | H04W 12/12 |
| 2021/0029107 A1* | 1/2021 | Parkinson | G06Q 30/0609 |
| 2021/0042830 A1* | 2/2021 | Burke | G06Q 20/384 |
| 2021/0103626 A1* | 4/2021 | Jolly | G06F 16/345 |
| 2021/0174128 A1* | 6/2021 | Charnock | G06V 10/774 |
| 2021/0256629 A1* | 8/2021 | Jolly | G06Q 50/01 |

\* cited by examiner

```
┌─────────────────────────────────────────────────────────┐
│ DISPLAY AN INTERACTIVE MAP COMPRISING A PLURALITY OF    │
│ REGIONS IN AN INTERACTIVE IDEOLOGY EXPLORATION          │
│ APPLICATION ACCESSIBLE TO A USER ON AN ELECTRONIC       │──752
│ DEVICE, WHEREIN EACH REGION OF THE PLURALITY OF         │
│ REGIONS IS ASSOCIATED WITH AT LEAST ONE IDEOLOGY        │
│ ATTRIBUTE OF A PLURALITY OF IDEOLOGY ATTRIBUTES, AND    │
│ WHEREIN EACH REGION OF THE PLURALITY OF REGIONS         │
│ COMPRISES A PLURALITY OF MEDIA ITEMS ASSOCIATED         │
│ WITH THE AT LEAST ONE IDEOLOGY ATTRIBUTE                │
└─────────────────────────────────────────────────────────┘
                              │
                              ▼
┌─────────────────────────────────────────────────────────┐
│ FACILITATE, BY THE INTERACTIVE IDEOLOGY EXPLORATION     │
│ APPLICATION, A VIRTUAL TOOL FOR THE USER TO NAVIGATE    │
│ FROM ONE REGION TO ANOTHER REGION OF THE PLURALITY      │──754
│ OF REGIONS BASED, AT LEAST IN PART, ON A USER           │
│ PREFERENCE, WHEREIN THE USER PREFERENCE COMPRISES       │
│ ONE OR MORE ACTIONS PERFORMED BY THE USER ON AT         │
│ LEAST ONE REGION OF THE PLURALITY OF REGIONS FOR        │
│ EXPLORING THE AT LEAST ONE REGION                       │
└─────────────────────────────────────────────────────────┘
                              │
                              ▼
┌─────────────────────────────────────────────────────────┐
│ FACILITATE SELECTION, BY THE INTERACTIVE IDEOLOGY       │
│ EXPLORATION APPLICATION, OF AT LEAST ONE PORTION OF     │──756
│ A MEDIA ITEM OF THE PLURALITY OF MEDIA ITEMS            │
│ ASSOCIATED WITH THE AT LEAST ONE IDEOLOGY ATTRIBUTE     │
│ IN THE REGION BASED, AT LEAST IN PART, ON THE USER      │
│ PREFERENCE                                              │
└─────────────────────────────────────────────────────────┘
                              │
                              ▼
┌─────────────────────────────────────────────────────────┐
│ RECEIVE, BY THE INTERACTIVE IDEOLOGY EXPLORATION        │
│ APPLICATION, AUTHENTICITY CHECK REQUESTS FROM A         │──758
│ PLURALITY OF USERS FOR DETERMINING AUTHENTICITY OF      │
│ THE AT LEAST ONE PORTION OF THE MEDIA ITEM              │
└─────────────────────────────────────────────────────────┘
                              │
                              ▼
                             (A)
                                                      750
```

FIG. 7B

INTERACTIVE METHODS AND SYSTEMS FOR EXPLORING IDEOLOGY ATTRIBUTES ON A VIRTUAL MAP

TECHNICAL FIELD

The present disclosure relates to an interactive virtual map for exploring ideology attributes and, more particularly to, electronic methods and processing systems for presenting religious and political ideologies in a structured way to examine, compare, contrast ideas, and exchange intellectual thoughts.

BACKGROUND

Ideologies have been an integral part of the world since its inception and people vary in these ideologies at various levels. An ideology is a set of opinions or beliefs of an individual or a group of people. For example, religious ideologies are an organized collection of beliefs, customs, moral and ethical standards that intend to explain the meaning of life, the origin of life, and/or relation of human with supernatural powers, and political ideologies define the organization of a society into various political groups and objectives. These ideologies define a person and influence the way he/she views the world. However, in most cases, people inherit ideologies than pursuing a journey to determine their preference for an ideology. Moreover, ideologies of people change over time based on their exposure to different ideologies. In some cases, the rising popularity of ideology may be attributed in part due to the influence of moral entrepreneurs that mask other ideologies.

The advent of social media has opened up new ways for people with similar interests to find, share, and discuss ideologies, both political and religious with friends and colleagues. The public has evolved to a stage where people are more vocal about their ideologies on social media. Although social media analyzes past behavior and customizes media content for a user based on interests and past behavior, the user does not get to explore different ideologies. Further, social media is usually flooded with media items associated with ideologies that are so contradictory that a person exploring an ideology may be confused and lose motivation to pursue the ideology. More specifically, there is no structured method or platform to explore ideologies.

Nowadays, the internet is flooded with an unprecedented amount of information, political and religious facts, views, discussions, and claims without any structured way to browse and validate factuality, challenge these claims, and weigh public agreement on these topics. The past few years have seen widespread claims that social media has been used as a tool to propagate false claims and hatred among people by promoting specific ideologies. Such media items that polarize ideologies and disrupt peace need to be checked to determine content accuracy. Although, social media provides exposure of ideologies, but has no power beyond it that could practically enable or bring about change in political scenarios.

Thus, there exists a technological need for a structured platform that prioritizes media information of different ideologies based on authenticity so as to depict public agreement or disagreement on controversial topics in a specific ideology and also provide a platform to discuss, compare, and browse ideologies to enable users to explore ideologies before pursuing an ideology

SUMMARY

Various embodiments of the present disclosure provide interactive methods and systems for exploring ideologies on a structured platform.

In an embodiment, a computer-implemented method for exploring ideologies is disclosed. The computer-implemented method performed by a processor includes displaying an interactive map comprising a plurality of regions on a User Interface (UI) in an electronic device for a user. Each region of the plurality of regions is associated with at least one ideology attribute of a plurality of ideology attributes. Each region of the plurality of regions includes a plurality of media items associated with the at least one ideology attribute. The computer-implemented method includes facilitating a virtual tool for the user for navigating from one region to another region of the plurality of regions based, at least in part, on a user preference. The user preference includes one or more actions performed by the user on at least one region of the plurality of regions for exploring the at least one region. The computer-implemented method also includes tracking a user identifier associated with the user based, at least in part, on the user preference to determine a journey of the user in the interactive map. The computer-implemented method further includes updating a status of the user on a user profile based, at least in part, on the journey in the interactive map.

In another embodiment, an ideology exploration system is disclosed. The ideology exploration system includes a communication interface, a memory comprising executable instructions and a processor communicably coupled to the communication interface. The processor is configured to execute the executable instructions to cause the ideology exploration system to at least display an interactive map comprising a plurality of regions on a User Interface (UI) in an electronic device for a user. Each region of the plurality of regions is associated with at least one ideology attribute of a plurality of ideology attributes. Each region of the plurality of regions includes a plurality of media items associated with the at least one ideology attribute. The ideology exploration system is further caused to facilitate a virtual tool for the user for navigating from one region to another region of the plurality of regions based, at least in part, on a user preference. The user preference includes one or more actions performed by the user on at least one region of the plurality of regions for exploring the at least one region. The idea exploration system is also caused to track a user identifier associated with the user based, at least in part, on the user preference to determine a journey of the user in the interactive map. The idea exploration system is further caused to update a status of the user on a user profile based, at least in part, on the journey in the interactive map.

In yet another embodiment, a method for exploring ideologies is disclosed. The method is performed by an interactive ideology exploration application. The method includes displaying an interactive map comprising a plurality of regions in the interactive ideology map application accessible to a user on an electronic device. Each region of the plurality of regions is associated with at least one ideology attribute of a plurality of ideology attributes. Each region of the plurality of regions comprises a plurality of media items associated with the at least one ideology attribute. The method includes facilitating a virtual tool for the user for navigating from one region to another region of the plurality of regions based, at least in part, on a user preference. The user preference includes one or more actions performed by the user on at least one region of the plurality of regions for exploring the at least one region. The method also includes facilitating selection of at least one portion of a media item of the plurality of media items associated with the at least one ideology attribute in the region based at least in part on the user preference. The method includes receiving an authenticity request for determining authenticity of the at least one portion of the media item. The method includes on successfully determining the authenticity, displaying the at least one portion of the media item with a color code based, at least in part, on the authenticity of the at least one portion of the media item. The color code indicates a content accuracy of the at least one portion of the media item. The method also includes tracking a user identifier associated with the user based, at least in part, on the user preference to determine a journey of the user in the interactive map. The method further includes updating a status of the user on a user profile based, at least in part, on the journey in the interactive map.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which:

FIGS. 7B and 7C collectively, represent a flow diagram of a method for exploring ideology attributes on an interactive map, in accordance with another example embodiment of the present disclosure.

Figure 1:
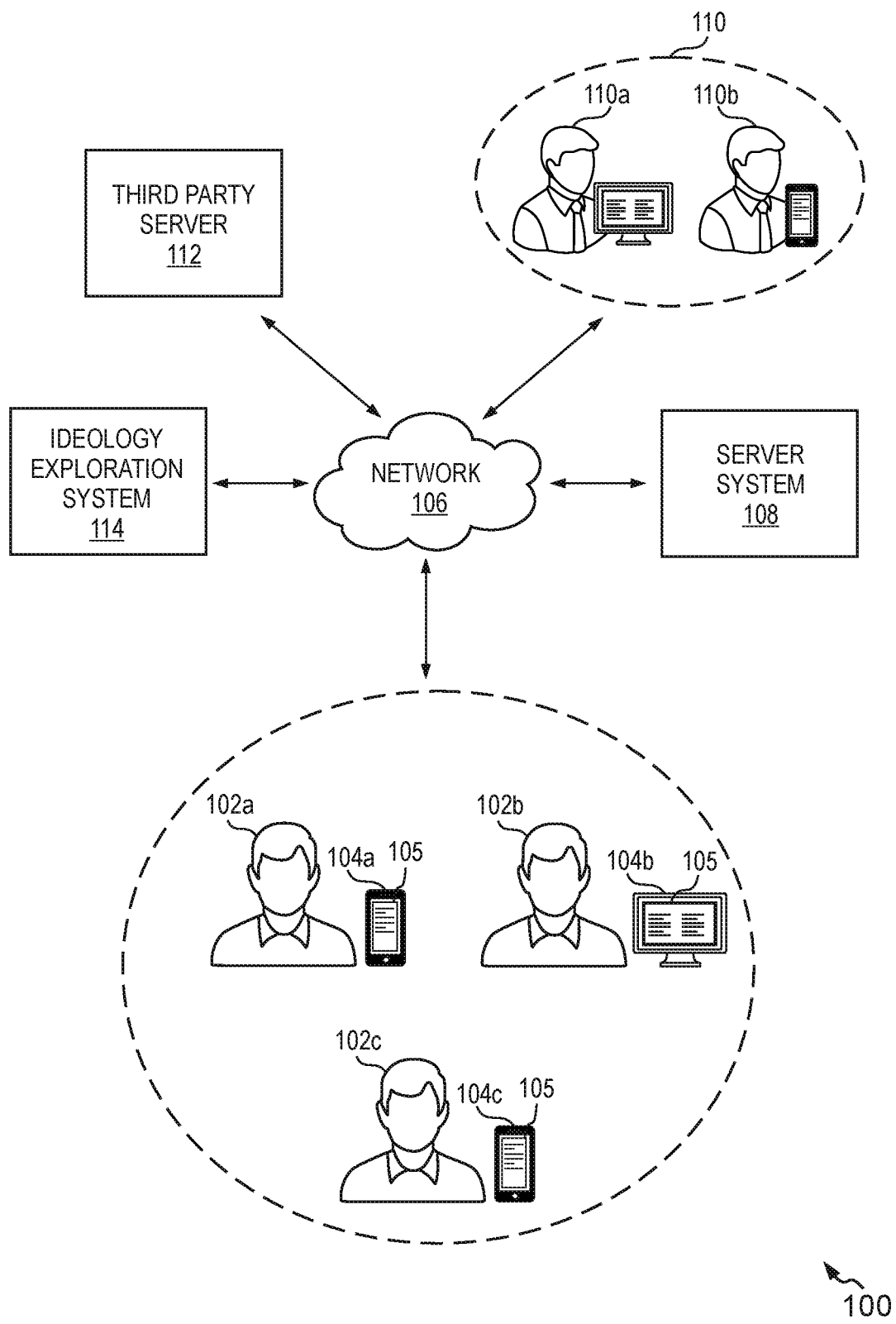
FIG. 1 is an example representation of an environment, in which at least some example embodiments of the present disclosure can be implemented.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "ideology", used throughout the description, generally relates to a set of beliefs or doctrines that guide an individual, a group of people, social movement and/or institutions. In other words, the ideology characterizes a custom or culture of an individual or a group of people and forms the basis of religion, political theory or policy. The terms, "ideology" and "ideology attributes" have been used interchangeably throughout the present description and may refer to religious ideologies and/or political ideologies.

Overview

Various embodiments of the present disclosure provide methods, systems electronic devices, and computer program products for interactively exploring different ideology attributes on a virtual map. More specifically, embodiments of the present disclosure provide an interactive method to challenge claims, validate the authenticity of claims, and weigh public agreement on various ideologies.

In an example, the present disclosure describes an ideology exploration system that provides one or more UIs to interactively explore ideology attributes. The ideology exploration system includes at least a processor and a memory. In one non-limiting example, the ideology exploration system is embodied in an electronic device associated with a user. The ideology exploration system is configured to display an interactive map comprising a plurality of regions on a User Interface (UI) in the electronic device for the user. Each region of the plurality of regions is associated with at least one ideology attribute of a plurality of ideology attributes. The ideology attribute can be a religious ideology attribute, a political ideology attribute, or a social cause ideology attribute. In at least one example embodiment, the plurality of regions includes a central public region. The central public region provides one or more virtual platforms for users associated with different ideology attributes to perform one or more of: make speeches, hold a banner, call for marches, and participate in protests. Each region of the plurality of regions includes a plurality of media items associated with the at least one ideology attribute. The media items may include text, audio, image, video, animation, or any combination thereof. For example, media items can be videos, fact sheets, discussion boards, transcripts, polls, weblinks (URLs), articles, debate material, reports, statistics, poll support material, references, etc. In one example, each media item of the plurality of media items in the central public region is associated with an authenticity score indicative of the content accuracy of the media item.

In some example embodiments, the ideology exploration system is configured to facilitate receipt of at least one biometric data from a user for registration by a third-party server. The third-party server is configured to generate a user code for the user based on the at least one biometric data. Further, the third-party server stores the user code for authentication of the user. During registration, the ideology exploration system is caused to display an ethical code policy defining a plurality of moral rules indicating offences and the corresponding penalty for the user on violation is displayed for the user accessing the interactive map on the electronic device. The user has to agree to the ethical code policy for accessing an interactive ideology exploration application that is facilitated and managed by the ideology exploration system on the electronic device of the user.

In an embodiment, the ideology exploration system is configured to provide a user identifier for the user based, at least, in part on the registration. More specifically, the user identifier is an e-passport of the user for tracking the journey of the user on the interactive map. After registration, the ideology exploration system is configured to facilitate creation of the user profile for the user based on the user identifier. The user profile comprises one or more user attributes. The term 'user attributes' refers to user-specific information such as user name, user identifier, rewards, authenticity score, virtual address, journey information, user interests, questions/responses posted, etc. The user profile of the user is stored with the user identifier.

In an embodiment, the ideology exploration system is configured to facilitate a virtual tool for the user for navigating from one region to another region of the plurality of regions based, at least in part, on a user preference. In one non-limiting example, the virtual tool is a bus that helps the user to move between regions for exploring ideology attributes of different regions. For example, the user may provide a click/touch input on a region associated with an ideology attribute indicating user preference to explore the region that transports the user to the selected region. The user preference includes one or more actions performed by the user on at least one region of the plurality of regions for exploring the at least one region. The one or more actions performed by the user on the at least one region includes one or more of: hosting events, endorsing events, creating polls, answering polls, hosting debates, participating in debates, posting media items, editing media items, initiating authenticity check request, posting questions, and responding to questions, starting a petition, suggesting a bill, criticizing a proposed bill and editing a proposed bill.

In at least one example embodiment, the ideology exploration system is configured to facilitate selection of at least one portion of a media item of the plurality of media items associated with the at least one ideology attribute in the region. Further, the ideology exploration system is configured to facilitate an option to determine authenticity of the at least one portion of the media item. More specifically, at least one action of the one or more actions from the user is received for determining the authenticity of the at least one portion of the media item. In other words, the user provides a touch/click input to provide the user preference for checking content accuracy of the at least one portion of the media item. In an embodiment, the ideology exploration system is configured to receive authenticity check requests for the at least one portion of the media item from a plurality of users.

In one embodiment, the ideology exploration system is configured to receive at least a part payment of a payment amount from a user for determining the authenticity of the at least one portion of the media item associated with the at least one ideology attribute in the region. The payment will vary based on selected content, for example, fact-checking a small portion will be charged less when compared to fact-checking the entire media item. Moreover, the plurality of users who request fact-checking of the same portion share costs (i.e., payment amount) thereby the user pays only a part of the payment amount. Further, the at least one portion of the media item is sent to a plurality of experts for determining the authenticity of the at least one portion of the media item when the authenticity check requests exceed a threshold request (e.g., 5 requests to check authenticity of an article). The experts may be individual researchers proficient in different disciplines or a board of researchers specialized in a discipline.

In one embodiment, on successfully determining the authenticity, the ideology exploration system is configured to display the at least one portion of the media item with a color code based, at least in part, on the authenticity of the at least one portion of the media item. The color code indicates a content accuracy of the at least one portion of the media item. The color code indicates at least one of: a false claim, a true claim, a controversial claim leans to be wrong, a controversial claim leans to be true, a fact check pending and a non-fact checkable claim. In some example embodiments, the ideology exploration system is configured to display a report based on the content accuracy of the at least one portion of the media item. Further, the report includes supporting evidence for the color code displayed on the at least one portion of the media item. In an embodiment, the ideology exploration system is configured to receive a media item for an ideology attribute associated with a region of the plurality of regions from the user. The media item includes a reference to the at least one portion of the media item with the color code and the report.

In some example embodiments, the ideology exploration system is configured to receive a region request from the user associated with the interactive map for creating a new region associated with a new ideology attribute. The new region can be created within an existing region as a subsection of a pre-existing ideology attribute or can be created in any unclaimed region between the plurality of regions. The region request includes at least a region specification, ideology attribute information, one or more media items for the new ideology attribute, and a plurality of endorsements from a plurality of users associated with the interactive map. The ideology exploration system verifies the region request based, at least in part, on the plurality of endorsements. For instance, if the new region for the new ideology attribute is part of larger territory (i.e., region) the ideology exploration system verifies if the beliefs of the new ideology attribute associated with the new region are aligned with ideology attributes of the larger territory, does the new region include approval of the governor of the larger territory and if the new ideology attribute has received a number of endorsements greater than a threshold. Thereafter, the ideology exploration system displays the new region on the interactive map. The new region displays the one or more media items for the new ideology attribute.

In some example embodiments, the ideology exploration system accesses a fact authenticity score associate with the user. The fact authenticity score of the user indicates a correctness of claims made by the user in one or more media items posted by the user. The fact authenticity score is compared with a threshold score. In an embodiment, on determining the fact authenticity score to be greater than the threshold score, the ideology exploration system provides a reward for the user of the interactive map. The reward is displayed on the user profile associated with the user.

In one embodiment, the user identifier associated with the user is tracked based on the user preference to determine a journey of the user in the interactive map. More specifically, the one or more actions of the user on the interactive map are tracked to determine the journey of the user. Thereafter, the ideology exploration system is configured to update the status of the user on the user profile based, at least in part, on the journey in the interactive map. The status of the user can indicate 'Visitor' if the user is exploring a region and 'resident' if the user resides in that region. It shall be noted that the user profile of the user is updated frequently based on user preferences.

Various example embodiments of the present disclosure are described hereinafter with reference to FIGS. 1 to 8.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, pruning neural networks, etc. The environment 100 generally includes a plurality of users 102a, 102b, and 102c, an ideology exploration system 114, a server system 108, a third-party server 112, each coupled to, and in communication with (and/or with access to) a network 106. The network 106 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or the users 102a, 102b, 102c illustrated in FIG. 1, or any combination thereof. Various entities in the environment 100 may connect to the network 106 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

For example, the network 106 may include multiple different networks, such as a private network made accessible by a plurality of electronic devices 104a, 104b and 104c associated with respective users 102a, 102b, 102c, separately, and a public network (e.g., the Internet etc.) through which the plurality of users 102a, 102b, 102c, and the ideology exploration system 114 may communicate. In one embodiment, the plurality of users 102a, 102b and 102c may believe in different ideology attributes or share same ideology attributes. The plurality of users 102a, 102b and 102c hereinafter is collectively represented as "the user 102". The electronic devices 104a, 104b and 104c may be any electronic device such as, but not limited to, a personal computer (PC), a tablet device, a Personal Digital Assistant (PDA), a voice activated assistant, a Virtual Reality (VR) device, a smartphone and a laptop. The plurality of electronic devices 104a, 104b and 104c hereinafter is collectively represented as "the electronic device 104".

The user 102 uses an application (i.e., "interactive ideology exploration application 105") on his/her electronic device 104 for accessing an interactive map provided by the ideology exploration system 114 for exploring ideologies (such as, for example, religious, political based ideologies). The interactive ideology exploration application 105 is a structured platform to browse different ideology attributes and to build a virtual community of users who have similar goals and worldview, thereby making it easier to take initiatives and hold community service projects.

The server system 108 may be a web server, a client server, open source server, real-time communication server, proxy server, virtual server or any combination thereof. In one example embodiment, the server system 108 is an application server and acts as a distribution platform for distributing applications to one or more users, for example, the user 102. The user 102 can access the server system 108 to download/install an instance of the interactive ideology exploration application 105 on the electronic device 104 via the network 106.

The third-party server 112 is configured to manage a plurality of users of the interactive ideology exploration application 105. The plurality of users can access the application 105 without registration or register as members for privileged access. The users who choose to access the application 105 without registration do not require authentication and access is restricted to viewing media items of the ideology attributes. However, these unregistered users do not enjoy privileges to participate in activities (i.e., vote, endorse, participate in polls, request authenticity check or reside in a region). Alternatively, registered members (e.g., the user 102) provide authentication data for accessing the interactive ideology exploration application 105. For instance, the third-party server 112 collects biometric data from the user 102 for registration with interactive ideology exploration application 105. The biometric data may refer to any individual characteristic of the user 102 such as, but not limited to, fingerprint, facial features, voice characteristics, and retina features for digitally identifying the user 102, and thereby provide access to the interactive ideology exploration application 105. In one embodiment, the third-party server 112 generates a user code for the user 102 based on the biometric data (e.g., fingerprint). The user code is stored in the third-party server 112 for authenticating the user 102 whenever the user 102 accesses the interactive ideology exploration application 105. This ensures that the user 102 does not have multiple accounts (i.e., user profiles) on the interactive ideology exploration application 105 or impersonate another user of the interactive ideology exploration application 105.

As described herein, the ideology attribute may include, but not limited to, any type of religious ideologies, such as, theism (e.g., pantheism, personal superpower, and moral doctrine), atheism or political ideologies, such as, Conservatism, Authoritarian, Libertarian, Left, Right, and so forth. In one embodiment, the ideology attribute may also refer to a subset of religious/political ideologies, any combination of ideological attributes from two or more different religious/political ideologies or religious/political ideologies with additional ideas or any combination thereof.

The ideology exploration system 114 includes a processor and a memory. The ideology exploration system 114 is configured to perform one or more of the operations described herein. In one embodiment, the ideology exploration system 114 is configured to display an interactive map for the user 102 on one or more User Interfaces (UIs) to find, unite and interact with users who have similar convictions, worldview, and life goals. In general, the interactive map depicts each ideology attribute as a region on the interactive map. Moreover, each region is depicted to include media items that define key features/beliefs, infographs, discussions, polls, fact sheets, articles, introductory videos, evidences, and so forth. The user 102 is provided with an e-passport (user identifier) that can be used to travel through different regions in the interactive map for discussing, comparing and exploring different ideology attributes. The user identifier of the user is used to track a journey of the user 102 on the interactive map. Further, the ideology exploration system 114 updates a status of the user 102 on a user profile of the user 102 based on his/her journey on the interactive map.

The ideology exploration system 114 is in communication with, via the network 106, the plurality of users 102a, 102b and 102c, and a plurality of experts 110. In other embodiments, the ideology exploration system 114 may actually be incorporated, in whole or in part, into one or more parts of the environment 100. In addition, the ideology exploration system 114 should be understood to be embodied in at least one computing device in communication with the network 106, which may be specifically configured, via executable instructions, to perform as described herein, and/or embodied in at least one non-transitory computer readable media.

For instance, the user 102 may want to determine accuracy of an article, published in the region (i.e., territory) of a political ideology on the interactive map. The user 102 sends a request to the ideology exploration system 114 with the article that needs to be checked for accuracy. The ideology exploration system 114 sends the article to the experts 110 for determining the content accuracy of the article. An expert (e.g., expert 110a, 110b) refers to a person who is proficient or skillful in a specific area, for example, history, geology, biology, theology, political science, philosophy, or a group of people (i.e., board) with people proficient in varied disciplines. The ideology exploration system 114 highlights the article to depict the content accuracy of the article based on a report provided by the experts 110.

In one embodiment, the content accuracy (i.e., authenticity) of the media item, as described herein, may be color coded based on evidence (e.g., false claim, true claim), or status of claim (e.g., fact check pending).

In one embodiment, the user 102 can host events, participate in events, endorse events, endorse media items, post materials, conduct polls, answer polls, host debates, participate in debates, organize community service, voice opinions, communicate with other users and the like.

In one embodiment, the electronic device 104 may create and store a user profile including both personal information and activity information on the interactive map (i.e., user attributes) associated with the user 102. The ideology exploration system 114 may update the status of the user 102 on the interactive map based on the activity information.

Specifically, in one embodiment, the ideology exploration system 114 provides an initial layout of the interactive map with predominant ideology attributes (Atheist, Christianity, Buddhism, Naturalistic, Hinduism, and Islam) in different regions on the interactive map. The interactive map is updated as users of the interactive ideology exploration application 105 form new ideology attributes based on discussions and convictions to create additional regions on the interactive map to reside with like-minded users who work together to achieve a desirable social outcome.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
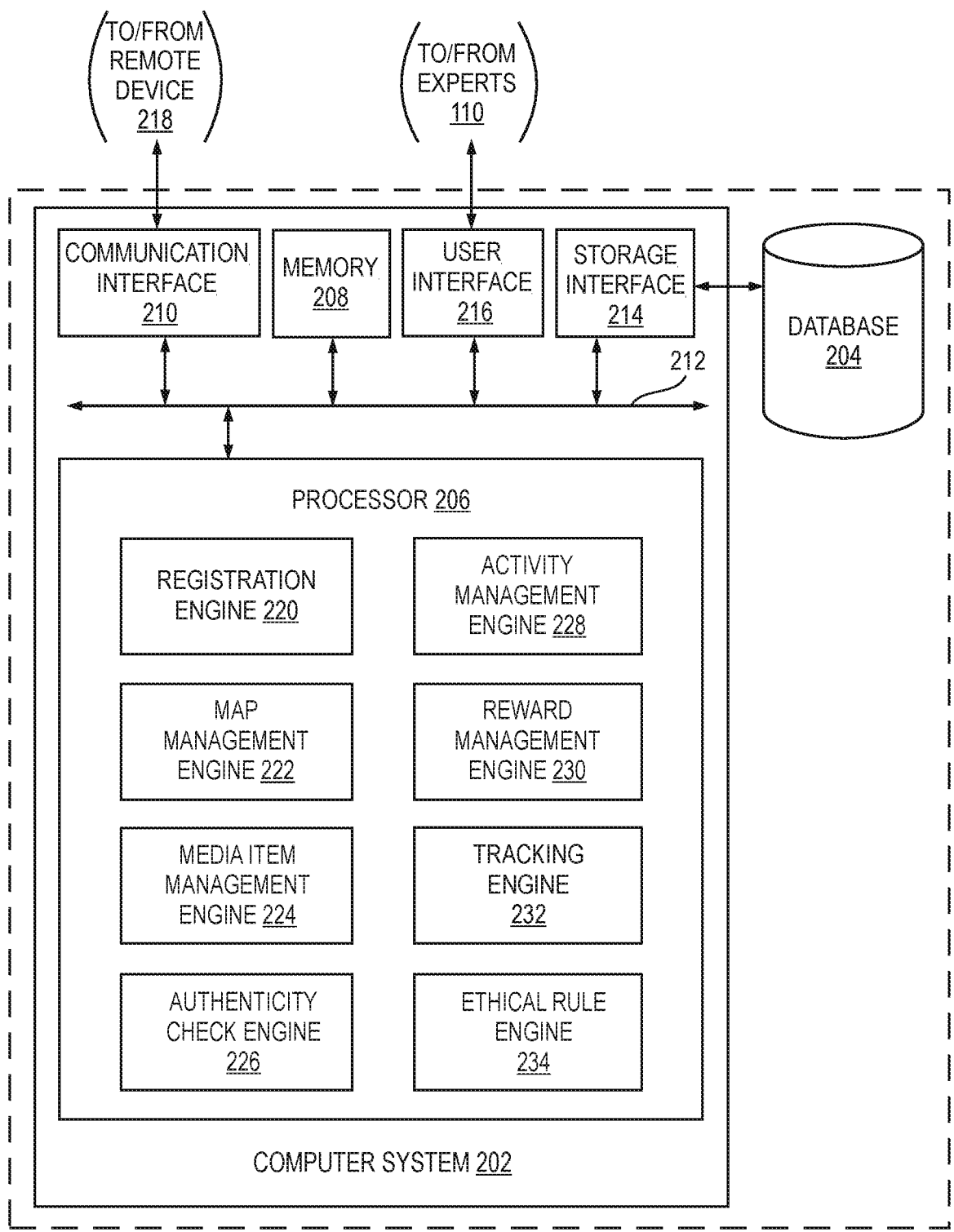
FIG. 2 is a simplified block diagram of an ideology exploration system, in accordance with an embodiment of the present disclosure.

Referring now to FIG. 2, a simplified block diagram of an ideology exploration system 200 is shown, in accordance with an embodiment of the present disclosure. The ideology exploration system 200 is similar to the ideology exploration system 114. In some embodiments, the ideology exploration system 200 is embodied as a cloud-based and/or SaaS-based (software as a service) architecture. In one embodiment, the ideology exploration system 200 is integrated within the electronic device 104. In another embodiment, the ideology exploration system 200 is part of the server system 108.

The ideology exploration system 200 includes a computer system 202 and a database 204. The computer system 202 includes at least one processor 206 for executing instructions, a memory 208, a communication interface 210, and a storage interface 214 that communicate with each other via a bus 212.

In some embodiments, the database 204 is integrated within the computer system 202. For example, the computer system 202 may include one or more hard disk drives as the database 204. A storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204. In some example embodiments, the database 204 is configured to store a user profile of the user 102.

Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the ideology exploration system 200, as described herein. In another embodiment, the memory 208 may be realized in the form of a database server or cloud storage working in conjunction with the ideology exploration system 200, without departing from the scope of the present disclosure.

The processor 206 is operatively coupled to the communication interface 210 such that the processor 206 is capable of communicating with a remote device 218 such as, the electronic device 104, the server system 108, the third-party server 112, the experts 110 or communicating with any entity connected to the network 106 (as shown in FIG. 1). Further, the processor 206 is operatively coupled to the user interface 216 for interacting with the experts 110 who determine authenticity of selected portions media items associated with an ideology and provide reports based on their observation.

It is noted that the ideology exploration system 200 as illustrated and hereinafter described is merely illustrative of an apparatus that could benefit from embodiments of the present disclosure and, therefore, should not be taken to limit the scope of the present disclosure. It is noted that the ideology exploration system 200 may include fewer or more components than those depicted in FIG. 2.

In one embodiment, the processor 206 includes a registration engine 220, a map management engine 222, a media item management engine 224, an authenticity check engine 226, an activity management engine 228, a reward management engine 230, a tracking engine 232 and an ethical rule engine 234. It should be noted that components, described herein, can be configured in a variety of ways, including electronic circuitries, digital arithmetic and logic blocks, and memory systems in combination with software, firmware, and embedded technologies.

The registration engine 220 includes suitable logic and/or interfaces for facilitating registration of the user 102 with the interactive ideology exploration application 105. The registration engine 220 facilitates creation of a user profile for the user 102 based on the biometric data. Examples of the biometric data include, but not limited to, fingerprint, voice features, facial features, retinal features or any other features/characteristic unique to a person. The use of biometric data for registration eliminates duplication of user profiles and/or impersonation of the user 102 on the interactive ideology exploration application 105. In one embodiment, the registration engine 220 is configured to generate an e-passport (i.e., a user identifier) for the user 102 after registration of the user 102 with the interactive ideology exploration application 105. The e-passport of the user 102 is provided a status of "Searcher" initially and is updated as the user 102 takes on a journey on the interactive map exploring ideology attributes. In one non-limiting example, the status may be displayed as "visiting" indicating that the user 102 is exploring an ideology attribute or "staying" indicating that the user 102 is a resident of that region (i.e., believes in that ideology attribute associated with that region) or "Departing" indicating that the user 102 is leaving a region (i.e., to start exploring another ideology attribute or believe in a different ideology attribute).

The user profile of the user 102 includes user attributes such as, the user identifier (i.e., e-passport), user name (i.e., real name/nick name), an optional image, an authenticity score, a status of the user 102 (e.g., resident, visiting), virtual address (i.e., region/ideology attribute), a journey summary of the user 102 on an interactive map associated with ideologies, answers and questions posted on the interactive ideology exploration application 105, events supported by the user 102, faith declaration summary and moral compass (i.e., user's position/stand in social, ethical, philosophical and religious surveys). It shall be noted that the user attributes described here are for example purposes only and embodiments of the present disclosure can include fewer or more user attributes than those described here. An example of the user profile of the user 102 is shown and explained with reference to FIG. 5B.

In one embodiment, if the user 102 provides a real name and uploads an image of himself/herself captured using the electronic device, the user profile of the user 102 is displayed with a colored frame. Moreover, the user 102 can change the user name, delete user name or switch from nick name to real name or vice versa. However, if the user 102 provides a real name as the user name, the user name is stored for verification purposes or potential identity theft. In one example scenario, if an identity theft claim is reported against the user 102, the registration engine 220 is configured to schedule an image verification session for the user 102. If the user 102 does not comply with the image verification session or fails the image verification process, the user 102 is banned from accessing the interactive ideology exploration application 105.

It shall be noted that some users of the application 105 can access the application 105 without registration and therefore do not require authentication and access is restricted to viewing media items of the ideology attributes.

The map management engine 222 includes suitable logic and/or interfaces for managing an interactive map facilitated by the interactive ideology exploration application 105 on the electronic device 104. The interactive map is a digitally structured virtual map for multiple users to discuss, compare, browse and decide on their beliefs (i.e., religious/political). In general, a plurality of regions is shown on the interactive map representing a plurality of ideology attributes. More specifically, the interactive map depicts a region (i.e., space) to be associated with at least one ideology attribute (e.g., Islam). In one embodiment, each faith will look like a territory on the interactive map and different denominations will appear as cities or towns. The towns or cities represent a subgroup within a territory which includes principles from the larger territory (i.e., religious/political ideology) but may differ in some doctrines. In one non-limiting example, Christianity is shown as a territory whereas Catholics and Protestants are depicted as cities and Methodists as a small town. Accordingly, each region (e.g., region associated with Christianity) may include more than one ideology attribute of the plurality of ideology attributes (e.g., Protestant, Catholic, Pentecost, Bretheren, etc). In an example embodiment, the interactive map displays a major ideology attributes and well-known denominations (e.g., Protestant, Catholics, Sunni Islam, etc.) on default.

In some example embodiments, each region has elected representatives who manage internal affairs of the region, for example, social events. More specifically, the elected representatives of a region are users with additional rights to make laws, interact with other members of the region, participate in debates, endorse events, host events, post materials, answer surveys and represent the region in various forums (e.g., a central public region) to explain and promote their ideology attributes. For example, each region can have governors or a board of directors or a Parliament (i.e., for a region associated with a political ideology attribute) associated with an ideology attribute that regulate events and manage corresponding territories (i.e., regions). These representatives of a region may be elected by an election process, such as, casting eVotes, endorsement of a candidate, etc.

In an embodiment, each region has a common gathering place, for example, a worship place for religious gatherings and a Parliament for political gatherings. The gathering place is presided by a head/elected representative. For example, a gathering in a Church for worship may be conducted by a Priest and the political gathering at the Parliament is managed by a speaker.

In some example embodiments, the interactive map includes a common region or (i.e., central public region) that is independent of religious/political ideology attributes. The central public region is a virtual independent square located at a centre of the interactive map and serves as a place to exchange ideas from users of the interactive ideology exploration application 105 in different subjects, such as, justice, equality, poverty, human trafficking, etc. It shall be noted that even a user with no interests in ideology attributes (i.e., religion/politics) can reside in a region with other users who share a similar perspective. These users can explore ideology attributes, challenge views of other ideology attributes and/or choose to move to a different region based on their convictions of that ideology attribute.

In one embodiment, the map management engine 222 is configured to provide a virtual tool for the user 102 to navigate on the interactive map. The virtual tool may depict any form of transport (e.g., a bus, a train) to browse the interactive map and enable movement of the user 102 from one region to another region in an animated way based on a user preference. More specifically, the maps management engine 222 is configured to receive an action (i.e., selection option) on one region of the plurality of regions. For example, when the user 102 logs in with credentials, the user 102 can board a bus and when the user 102 provides the user preference (i.e., action) for a region (i.e., ideology attribute), the bus transports the user 102 to a corresponding region (e.g., Buddhism). In some example embodiments, the user 102 can create shortcuts and favorite lists for regions he/she likes to visit again without going through the whole journey. In some example embodiments, the user 102 can plan an itinerary for exploring one or more ideology attributes. For instance, the itinerary of the user 102 may include stops at regions corresponding to Islam, Christianity and Catholic to learn more about the ideology attributes. The user 102 can board the bus and a voice track will guide the user 102 through the trip. For example, the voice track explains main features and/or interesting snippets associated with the stops (i.e., Islam, Christianity and Catholic).

In some example embodiments, the user 102 can request a piece of land (i.e., a new region) on the interactive map for promoting a new ideology attribute. In general, the interactive map includes provisions to house small groups of users in rooms. These rooms may be associated with an ideology attribute that may or may not be part of a pre-existing region. More particularly, the room includes an administrator who manages the small groups that advocates and propagates a new ideology attribute. The map management engine 222 is configured to receive a region request from the user 102. In one example, the region request may be received from the administrators of the rooms when they gather sufficient people to form a larger territory (i.e., village, town, city). The region request includes a region specification (i.e., location on the interactive map indicating a new region for a new doctrine or denomination of existing ideology attribute), ideology attribute information (beliefs, doctrines, principles), one or more media items for the new ideology attribute (e.g., videos, articles, fact sheets) and a plurality of endorsements from a plurality of users of the interactive map. In one non-limiting example, the user 102 may circle a portion of space on the interactive map to provide the region specification and initiate the region request. The map management engine 222 is configured to verify the region request based on the plurality of endorsements. For instance, the number of endorsements must be greater than a threshold (e.g., 50 user endorsements). Additionally, the map management engine 222 verifies media items to ensure that the new ideology attribute does not promote hatred or violence among users of the interactive map. Thereafter, the map management engine 222 is configured to display the new region on the interactive map. The new region displays media items for the new ideology attribute. Alternatively, when a number of residents in a region (e.g., territory associated with Anarchism) reduce, for example, many residents choose to leave the region, the region on the interactive map be abandoned and the ideology attribute (i.e., Anarchism) is moved to a room. It shall be noted that a region may be updated based on a number of residents in the region, for example, from a room to village/town/city, etc.

The media item management engine 224 includes suitable logic and/or interfaces for managing media items associated the plurality of ideology attributes on the interactive map. Each ideology attribute is associated with a number of media items that may be displayed as icons on the region when the user 102 enters a territory (i.e., region), for example, Islam. Example of the media items may include, but not limited to, introductory videos, fact sheets, articles, videos with transcripts, statistics, infographs, social media posts, discussion boards, newspaper cutouts, etc. In one embodiment, the media item that may be displayed to the user 102 is age-classified. For instance, the media items displayed to adults may not appear on the interactive map when a younger kid accesses the interactive map via the interactive ideology exploration application 105. An example of media items associated with an ideology attribute is shown and explained with reference to FIG. 3C.

In one embodiment, the media item management engine 224 manages media items associated with the central public region of the interactive map. The media items associated with the central public region may be free blogs, videos, fact sheets and articles based on social causes independent of any ideology attribute, for example, justice, equality, fighting poverty, human trafficking, child labor, etc. Additionally, each of these media items include a fact authenticity score indicating the content accuracy of the corresponding media item.

Specifically, the media item management engine 224 is configured to receive media items from users of the interactive map. In one embodiment, the media item management engine 224 is configured to ensure that the media items do not promote hatred or violence among the users of the interactive map. Accordingly, the media item management engine 224 is configured to check violations of ethical or moral policy in conjunction with the ethical rule engine 234. If the media item management engine 224 identifies the media item to be against the ethical or moral policy, the media item management engine 224 is configured to block the media item from being posted by the user 102. Alternatively, if a number of users of the interactive ideology exploration application 105 report a media item as causing distress or disrupting peace in the region, the media item management engine 224 removes the media item from the interactive map.

In at least one example embodiment, the media item management engine 224 is configured to receive a media item for an ideology attribute associated with a region that includes a reference to a portion of the media item or a media item that was checked for authenticity. In general, the user 102 can submit an answer, and post an article/video/image that is related to the portion of the media item that was fact-checked by the authenticity check engine 226 by referring to the portion of the media item and/or quoting substantial portion of the fact-checked media item. In some example embodiments, the media item management engine 224 is configured to specify a nominal fee that has to be paid by the user 102 for reutilizing fact-checked portions of media item to author a content. The nominal fee may depend on length of portion and/or a popularity of the media portion. An example of a media item that includes a reference to a fact-checked media item is shown and explained with reference to FIG. 4E.

In one embodiment, the media item management engine 224 is configured to display media items associated with an ideology in an order based on number of endorsements associated with each of the media item. For instance, videos posted in a region associated with an ideology attribute (e.g., Vaishnavism) are arranged in a descending order based on number of endorsements, for example a video with highest number of endorsement appears first on the region and a video with least number of endorsements appears at the last.

In one example, answers posted by multiple users for a question on a discussion board are arranged in a descending order based on endorsement for an answer. In an alternate embodiment, the media item management engine 224 is configured to display media items associated with an ideology in an order based on authenticity score of a corresponding author. For example, answers posted in response to a question on a discussion board are sorted such that an answer of a user associated with a high authenticity score (e.g., 80%) appears first and the answer of a user with a low authenticity score (e.g., 30%) appears last in a list of answers It shall be noted that a media item may include, text, image, video, or any combination thereof of an ideology attribute.

The authenticity check engine 226 includes suitable logic and/or interfaces for determining authenticity of a media item. More specifically, the authenticity check engine 226 receives at least one portion of a media item associated with an ideology attribute for determining authenticity. In other words, the user 102 provides at least one action (i.e., a touch/click input) to provide the user preference for checking content accuracy of the at least one portion of the media item. It shall be noted that the user 102 can select a portion of a media item or the media item as a whole to determine authenticity. For example, the user 102 may select only a portion of transcript associated with the introductory video of an ideology attribute (e.g., Republican) and request for a fact-check (i.e., determine authenticity). The term "authenticity" as used herein refers to determining content accuracy of the media item. In other words, the authenticity check engine 226 is configured to check if the facts, information, transcripts, statistics or images selected by the user 102 are a correct claim or not with the aid of experts. The authenticity check engine 226 receives the media item and sends it to a panel of experts (e.g., experts 110) in different disciplines (e.g., history, journalism, science, religion, etc.) via the communication interface 210 for determining the content accuracy. In some example embodiments, the authenticity check engine 226 is configured to aggregate authenticity check requests from multiple users for a portion of the media item. For example, 10 users may request fact-check of the same media item (e.g., video). The media item is sent to the experts for determining authenticity only when the authenticity check requests exceed a threshold request (e.g., 8 authenticity check requests). In one embodiment, the user 102 has to pay for determining the accuracy of the media item. More specifically, the user 102 is charged an amount based on the portion of the media item that has to be checked for accuracy or number of users requesting authenticity check. In one non-limiting example, the amount charged for determining authenticity of an entire article or video is higher when compared with a portion of the article/video. In at least one example embodiment, the plurality of users share costs (i.e., payment amount) for determining authenticity of the media item. The user 102 should make a part payment prior to sending the media item for checking content accuracy (i.e., determining authenticity).

In one embodiment, the experts 110 provide a report based on analyzing the media item (or selected portion of the media item) via the user interface 216. The report indicates the content accuracy of the media item (or portion of the media item) as determined by experts 110 in different fields. More specifically, the report includes supporting evidence that is a collection of facts or information indicating whether a belief or proposition is true and/or valid. Additionally or optionally, the supporting evidence includes reference to printed or published materials that support the report.

The authenticity check engine 226 is configured to display the portion of the media item with a color code based on the authenticity of the portion of the media item. For instance, an authenticity score is computed for the portion of the media item based on the report provided by the experts 110. The authenticity check engine 226 highlights (i.e., changes font color) the portion of the media item with a color code based on the authenticity score. In one non-limiting example, different ranges of authenticity score are associated with different colors (e.g., 10-30: red color, 31-50: orange color, 51-70: yellow color, 71-90: blue color, and 90-100 green color). The color code indicates a content accuracy of the portion of the media item. For example, the color code indicates at least one of a false claim, a true claim, controversial leans to be wrong, controversial leans to be true, fact check pending and non-fact checkable. In some embodiments, the user 102 can raise an appeal against the report provided by the experts 110. The appeal may be referred to the same or different experts who review the media portion and the report to validate the media portion. The user 102 can view the color code and report as shown and explained with reference to FIGS. 4C-4D.

The activity management engine 228 includes suitable logic and/or interfaces for managing the activities in each region based on user preferences. More specifically, the activity management engine 228 is configured to manage activities initiated or suggested by the user 102 or elected representatives. For example, the user 102 performs one or more actions in a region (e.g., Christianity) for hosting, suggesting and/or endorsing initiatives, such as, social events, polls, debates, fundraisers, etc.

The residents of a region (i.e., users who believe in an ideology attribute of that region) can suggest and/or initiate events. More specifically, elected members with additional rights have power to endorse and host events in the region. However, the initiatives (also referred to as "activities") will be conducted only after reaching a certain number of endorsements. For instance, a debate will be organized only when 40% percentage of the population (i.e., users) endorse that debate. It shall be noted that any user of the interactive map can endorse an initiative hosted in a region.

The activity management engine 228 is configured to manage the discussion board in each region of the interactive map. Any user of the interactive map can post question and/or responses to questions on the discussion board. Moreover, residents of any region can only endorse questions so that it appears on top of the discussion board. However, only residents of the region (i.e., users who believe in the ideology attribute associated with the region) can endorse the answers. The response with the most number of endorsements appears on top amongst a number of responses.

Moreover, one or more users can suggest questions for the e-debate and an independent board establishes protocols and determines authenticity of scientific and/or historical facts used by the debaters. The independent board may be constituted by a number of users as selected by the board of governors or any other means, for example, e-Vote.

In at least one example embodiment, the activity management engine 228 facilitates super endorsements of activities in the interactive map. More specifically, official organization (i.e., religious/political institutions) of pre-existing regions, for example, Vatican for Catholics have a super endorsement privilege and can support an activity with a super endorsement. For instance, if the user 102 posts a response on a discussion board and if the official organization (e.g., Vatican) provides a super endorsement, the response of the user 102 appears on top with a different color.

Further, only residents of the region will be able to e-vote and participate in polls that cover a range of social, ethical, philosophical and religion-related subjects. Moreover, if the user 102 departs from the region (i.e., believes in a different ideology attribute or explores a different ideology attribute) to another region, e-votes and answers to poll surveys posted by the user 102 will be voided.

In some embodiments, the central public region provides virtual platforms for users associated with different ideology attributes to perform activities such as, but not limited to, make speeches, hold a banner, call for marches, participate in protests, etc. For instance, the user 102 who initiates a protest is depicted with an actual or a comical figurine and a crowd meter indicating number of users participating in the protest. The protest may be organized to oppose political matters (e.g., bill), religious matters (e.g., a principle or custom), or to request for amenities. In one embodiment, the protest can be organized to bring reformation in specific ideology attribute in a specific location of the territory (i.e., region), for example, a capital of the region. In one embodiment, the activity management engine 228 is configured to verify residence and citizenship of the user 102 organizing the protest before displaying a notification of the protest. Any user of the interactive map facilitated by the interactive ideology exploration application can endorse the protest. Further, the activity management engine 228 is configured to count a number of users supporting the protest based on the endorsements to display on the crowd meter. In some example embodiment, any registered member (e.g., the user 102) can post media items as blogs or vlogs in the interactive map.

In some example embodiments, members of a region can perform one or more actions, such as, start a petition, suggest a bill, edit a proposed bill and criticize a proposed bill. For example, a virtual parliament session may be conducted in the region (e.g., region associated with Democrats) and the elected representatives of the region can formulate and pass bills that may be suggested, criticized, opposed or proposed changes by any member of that region (i.e., region associated with Democrats). These activities in the regions of the interactive map serve as a great tool to compare political landscape of a territory with international views and enable elected representatives of a Government to know popular ideas, needs of citizens of their country and even normal citizens (i.e., users of the interactive map) can voice their opinions so as to push elected officials for ensuring appropriate decision-making that reflects public interest.

The reward management engine 230 includes suitable logic and/or interfaces for providing rewards for users. More specifically, the user 102 is associated with an authenticity score that reflects the correctness of the media item (e.g., videos, responses, facts, etc.) posted by the user 102 on the interactive map till date. The authenticity score of the user 102 is displayed on the user profile of the user 102 (see, 560 in FIG. 5B). In other words, the interactive ideology exploration application 105 rewards users who post media items with high content accuracy. For example, the user 102 has posted 30 media items (e.g., videos, answers/articles posted in discussion board) related to ideology attributes on the ideology exploration application 105. Assuming, the authenticity of 20 media items have been checked and 18 media items are determined to include correct claims (i.e., as determined by the experts 110), then the authenticity score of the user 102 is 90%. The reward management engine 230 compares the authenticity score with a threshold score (e.g., 80%) and when the authenticity score of the user 102 is greater than the threshold score, the reward management engine 230 facilitates the reward for the user 102. The reward is displayed on the user profile of the user 102. In another embodiment, the reward management engine 230 rewards users with large number subscribers (e.g., 5000) and high authenticity scores (e.g., 90%). The reward management engine 230 includes a rule base that may be predefined to include one or more thresholds (e.g., subscriber threshold, authenticity threshold, etc.) for determining various rewards for the users. In one non-limiting example, the reward management engine 230 may provide podium certification or gold/silver microphone awards for bloggers/vloggers depending on number of subscribers and/or authenticity score.

The tracking engine 232 includes suitable logic and/or interfaces for tracking a journey of the user in the interactive map. In general, the user preferences of the user 102 for exploring regions of the interactive map are tracked by the tracking engine 232. More specifically, every action of the user 102 on the interactive map, for example, activities such as, selecting a region to explore, ideology attribute selection, endorsements, debates, answers/responses posted, media items posted, events hosted/participated, interests, protests, etc., are tracked based on the user identifier (i.e., e-passport) to determine the journey of the user 102. For instance, the user 102 is usually provided a status of "searcher" when he initially accesses the interactive map. If the user 102 selects a region (i.e., ideology attribute selection), the virtual tool transports him to that region. The user 102 may explore the media items in that region which is tracked by the tracking engine 232 and based on the ideology attribute selection of the user 102; the tracking engine 232 provides a status of "Visitor" to the user 102. Further, if the user 102 is convinced of that ideology attribute, he can provide an action on that region (e.g., Christianity) that changes his status to "Resident" on the user profile. Moreover, the user 102 can provide another action (e.g., select an option) on the region indicating that he does not agree with the ideology attribute and the status of the user 102 changes to "Departing".

In at least one embodiment, the tracking engine 232 is configured to update a status of the user 102 on the user profile based on the journey. The status of the user 102 is shown on the user profile with information of his/her journey on the interactive map. An example of the user profile of the user 102 depicting status and the journey of the user 102 is shown and explained with reference to FIG. 5B.

The ethical rule engine 234 includes suitable logic and/or interfaces for determining violations of users in the interactive map. More specifically, the registration engine 220 displays an ethical code policy for the user 102 prior to registration. The ethical code policy defines a plurality of moral and ethical rules for the user 102 of the interactive map. Further, the ethical code policy also indicates offences and corresponding penalty for the user 102 on violation of the ethical code policy. In one embodiment, the user 102 can access the interactive map only when he/she agrees to the ethical code policy.

The ethical rule engine 234 is configured to communicate with the media item management engine 224 and the activity management engine 228 to monitor the activities organized and the media items that are posted by the user 102 on the interactive map. More specifically, the ethical rule engine 234 ensures that any media item that is posted on the interactive map or any activities organized in the region adhere to the ethical code policy of the interactive ideology exploration application 105.

In an embodiment, the ideology exploration system 200 causes display of one or more user interfaces (UIs) on the electronic device 104 via the interactive ideology exploration application 105 for exploring ideology attributes (e.g., political or religious) on the interactive map. Example UIs displayed to the user 102 for exploring ideology attributes based on user preference to discuss, compare and exchange political/religious ideas are shown in FIGS. 3A-3C to 5A-5B.

Figure 3A:
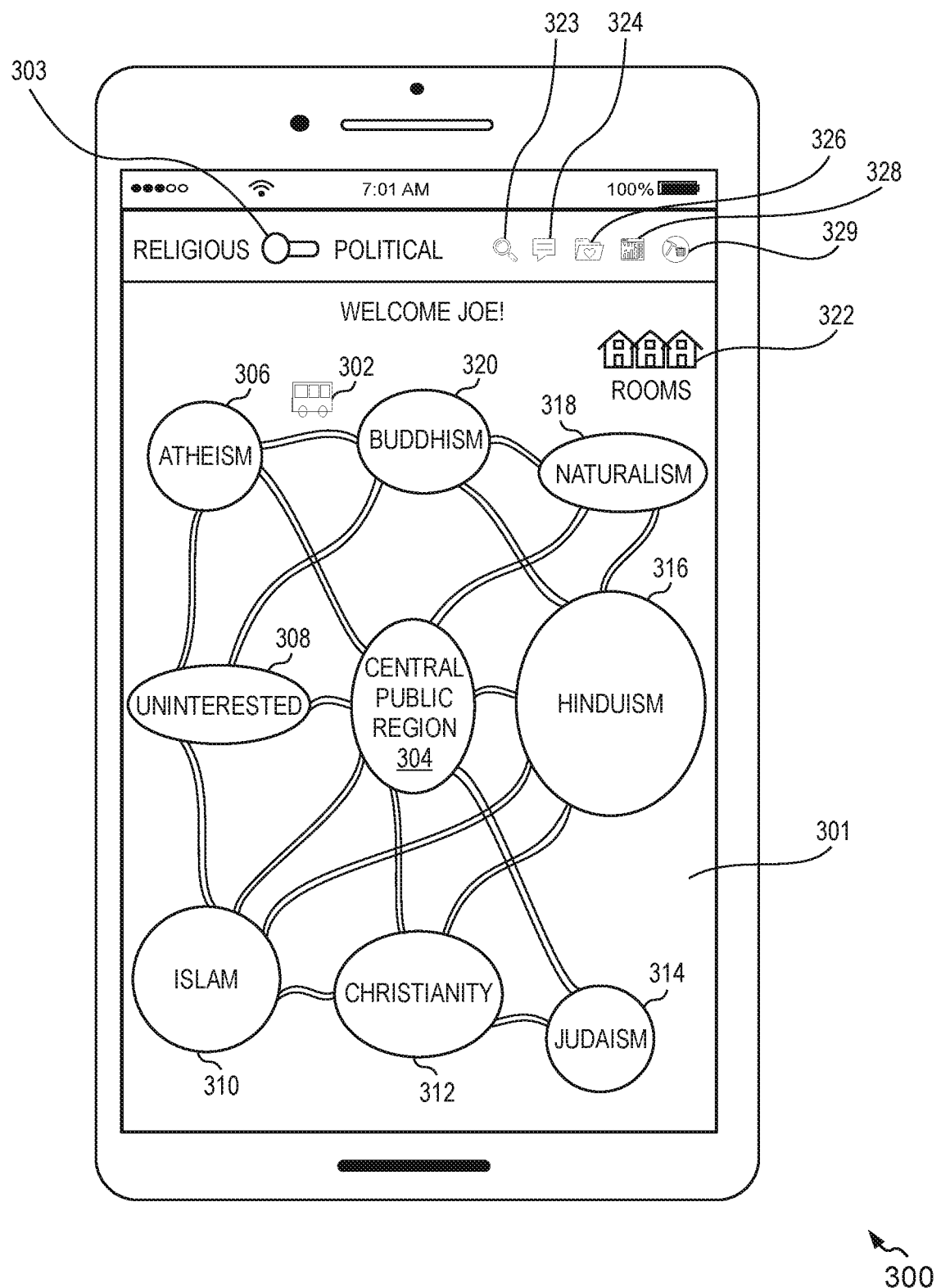
FIG. 3A illustrates an example representation of a UI displayed to a user of an electronic device by an interactive ideology exploration application for exploring a plurality of ideology attributes on an interactive map, in accordance with an embodiment of the present disclosure.

FIG. 3A illustrates an example representation of a UI 300 displayed to a user 102 of an electronic device 104 by the ideology exploration system 200 for exploring a plurality of ideology attributes on an interactive map 301, in accordance with an embodiment of the present disclosure. The electronic device 104 is an example of an electronic device 800 shown and explained with reference to FIG. 8. The user 102 can access the interactive ideology exploration application 105 on UI of the electronic device 104 using soft buttons such as an icon or a clickable link, and/or even using a physical button to provide user preferences for exploring regions (i.e., ideology attributes) on the interactive map 301.

The UI 300 is depicted to include a header portion and a content portion. The header portion is depicted to include a toggle button 303 and icons 323, 324, 326, 328 and 329. The user 102 can move the toggle button 303 to a right direction for accessing the interactive map 301 associated with religious ideology attributes or a left accessing an interactive map associated with political ideology attributes (not shown in FIG. 3A).

When the user 102 provides a touch/click input on the icon 323, a virtual tool 302 appears on the interactive map 301. The virtual tool can be used by the user 102 for exploring regions on an interactive map 301. Additionally or optionally, an overlay may be presented on the interactive map 301 that requests the user 102 to provide a preferred destination or provide interests such that the ideology exploration application 105 can customize a tour for the user 102 based on interests. The user 102 can view notifications/messages by clicking on the icon 324. The ideology exploration application 105 also enables the user to save/bookmark favorites (e.g., media items, vloggers, bloggers, villages or rooms). The user 102 can view the saved/bookmarked favorites by clicking on the icon 326. The user 102 can participate in general surveys/polls by providing a touch/click input on the icon 328. When the user 102 provides a touch/click input on the icon 329, a fact-mine repository is displayed to the user 102. More specifically, the fact-mine repository includes a collection of fact-checked media items. Moreover, status of the fact-checked media items is also displayed. The user 102 can browse through the fact-mine repository and choose to use any of the fact-checked media item to author new content (i.e., media item). However, it shall be noted that user 102 may have to pay requisite fees to use the fact-checked media item as reference. An example of using fact-checked media item as reference is shown and explained with reference to FIG. 4E.

The content portion displays a title associated with text "WELCOME JOE!" and a virtual map (i.e., the interactive map 301) depicting virtual territories of different ideology attributes as location icons 304, 306, 308, 310, 312, 314, 316, 318 and 320 with geo-fences. The virtual territories may be pre-defined in form of default setting on the interactive ideology exploration application 105. The geo-fences may be adapted or modified based on number of users residing in that territory (i.e., population in the virtual territory). Each territory is associated with an ideology attribute or a religion. For example, prominent religions are shown in the interactive map 301, such as text indicating 'CENTRAL PUBLIC REGION' depicted to be associated with the location icon 304, text indicating 'ATHEISM' depicted to be associated with the location icon 306, text indicating 'UNINTERESTED' depicted to be associated with the location icon 308, text indicating 'ISLAM' depicted to be associated with the location icon 310, text indicating 'CHRISTIANITY' depicted to be associated with the location icon 312, text indicating 'JUDAISM' depicted to be associated with the location icon 314, text indicating 'HINDUISM' depicted to be associated with the location icon 316, text indicating 'NATURALISM' depicted to be associated with the location icon 318, and text indicating 'BUDDHISM' depicted to be associated with the location icon 320. It shall be noted that the territories depicted in FIG. 5A may include smaller areas, such as, cities, town, villages. More specifically, the smaller areas (i.e., regions) are sub-sects of the religion that believe in principles of the territory and also have additional doctrines that differ from other cities/towns/villages. Moreover, it shall be noted that each ideology attribute is associated with each region (i.e., territory, city, town, or village).

The interactive map 301 also includes the virtual tool 302 that is depicted as a bus that enables the user 102 to travel from one region to another region. It shall be noted that the bus is shown for example purposes and the virtual tool 302 may be represent any mode of transport for transporting the user 102 based on his/her preference. The user 102 may provide a touch or a click input to board/deboard the bus. Further, the user 102 may provide a touch or a click input on any of the locations icons 304, 306, 308, 310, 312, 314, 316, 318 and 320 to select an ideology attribute for exploring the ideology attribute. The selection of any of the location icons 304, 306, 308, 310, 312, 314, 316, 318 and 320 may show a virtual movement of the user to another region that causes display of another UI which displays another set of regions (e.g., cities, towns, and villages) that depict denominations of that specific religion. An example UI provisioned to the user 102 when the user 102 provides the click input on the location icon 312 is shown in FIG. 3B.

It shall be noted that although the embodiments of the present disclosure can be practiced with both political and religious ideology attributes, the UI 300 depicts only religious ideology attributes as regions on the interactive map 301 and description of the political ideology attributes as regions on the interactive map 301 has been precluded for the sake of brevity. However, it shall be apparent that regions associated with political ideology attributes are depicted in the same way as shown in UI 300.

Figure 3B:
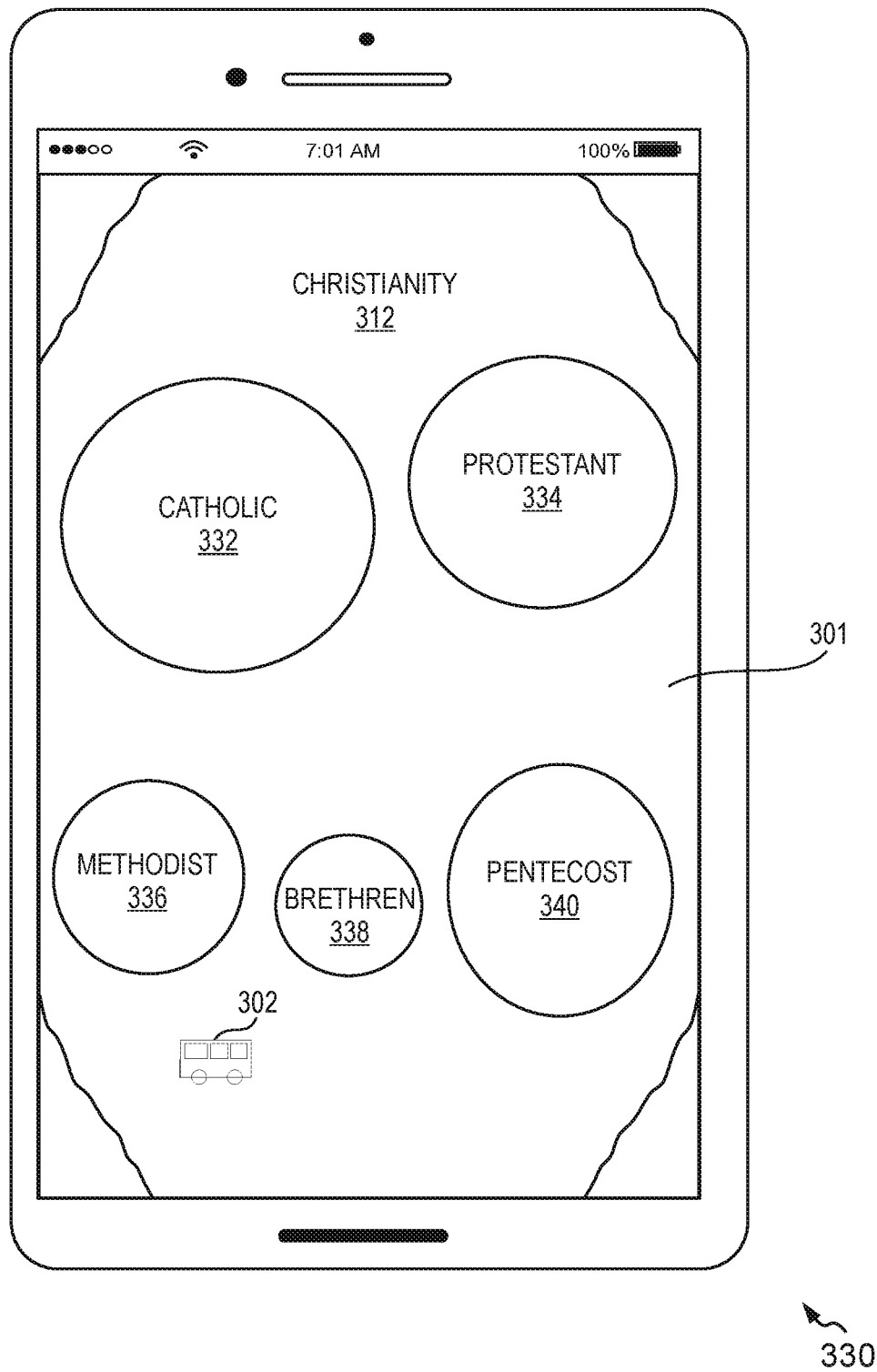
FIG. 3B illustrates an example representation of a UI displayed to a user of an electronic device by an interactive ideology exploration application for exploring a plurality of ideology attributes on an interactive map, in accordance with another embodiment of the present disclosure.

FIG. 3B illustrates an example representation of a UI 330 displayed to the user 102 of the electronic device 104 by the interactive ideology exploration application 105 for exploring a plurality of ideology attributes on the interactive map 301, in accordance with another embodiment of the present disclosure. The UI 330 may be presented to the user 102 in response to the click input received on the location icon 312 shown in FIG. 3A.

In one example, as the bus moves towards the region on which the click input was received, the UI 330 is displayed. The UI 330 is an enlarged portion of the region (i.e., Christianity) shown by the location icon 312. As already explained, the enlarged portion depicts various denominations of the ideology attribute (i.e., Christianity) as cities, towns and villages.

The smaller areas (i.e., regions) indicating sub-sects of an ideology attribute are shown as location icons 332, 334, 336, 338 and 340 with geo-fences. The regions indicating denominations may either be pre-defined in form of default setting on the interactive ideology exploration application 105 or may be created when the user 102 provides a land request for a new ideology attribute. However, it shall be noted that if a user requests a land for an unmapped town (i.e., new ideology attribute) inside a mapped territory (i.e., pre-existing ideology attribute), the belief fact sheet of the unmapped town must be aligned with the belief fact sheet of the main territory (i.e., mapped territory), receive approval from the elected representative of the mapped territory or receive enough endorsements from the residents of the mapped territory. Moreover, there usually exists a lot of unclaimed land between territories and members can request land near/closest to the territory with which they can identify themselves.

The geo-fences may be adapted or modified based on number of users residing in that region. Each city, town or village is associated with an ideology attribute. For example, prominent denominations are shown in the interactive map 301, such as text indicating 'CATHOLIC' depicted to be associated with the location icon 332, text indicating 'PROTESTANT' depicted to be associated with the location icon 334, text indicating 'METHODIST' depicted to be associated with the location icon 336, text indicating 'BRETHREN' depicted to be associated with the location icon 338 and text indicating 'PENTECOST' depicted to be associated with the location icon 340.

The UI 300 includes an icon 322 associated with text indicating 'ROOMS'. The user 102 can explore ideology attributes that have very less residents (e.g., less than 5000 residents) by clicking on the icon 322. More specifically, when a number of residents are less, the ideology attribute is not shown as region (i.e., village/town/city) on the interactive map 301 but appear as rooms. When the user 102 provides a touch/click input on the icon 322, a list of rooms on the interactive map 301 is displayed for the user 102. It shall be noted that the rooms can evolve to regions with sufficient endorsements or regions can degrade to rooms when users abandon a region.

The user 102 can choose to explore any of the regions in the territory (i.e., Christianity) by providing a touch or a click input on any of the locations icons location icons 332, 334, 336, 338 and 340 to select and explore the ideology attribute. The selection of any of the location icons location icons 332, 334, 336, 338, and 340 causes display of another UI which displays information and activities associated with that region (e.g., Protestant). An example UI provisioned to the user 102 when the user 102 provides the click input on the location icon 334 is shown in FIG. 3C.

Figure 3C:
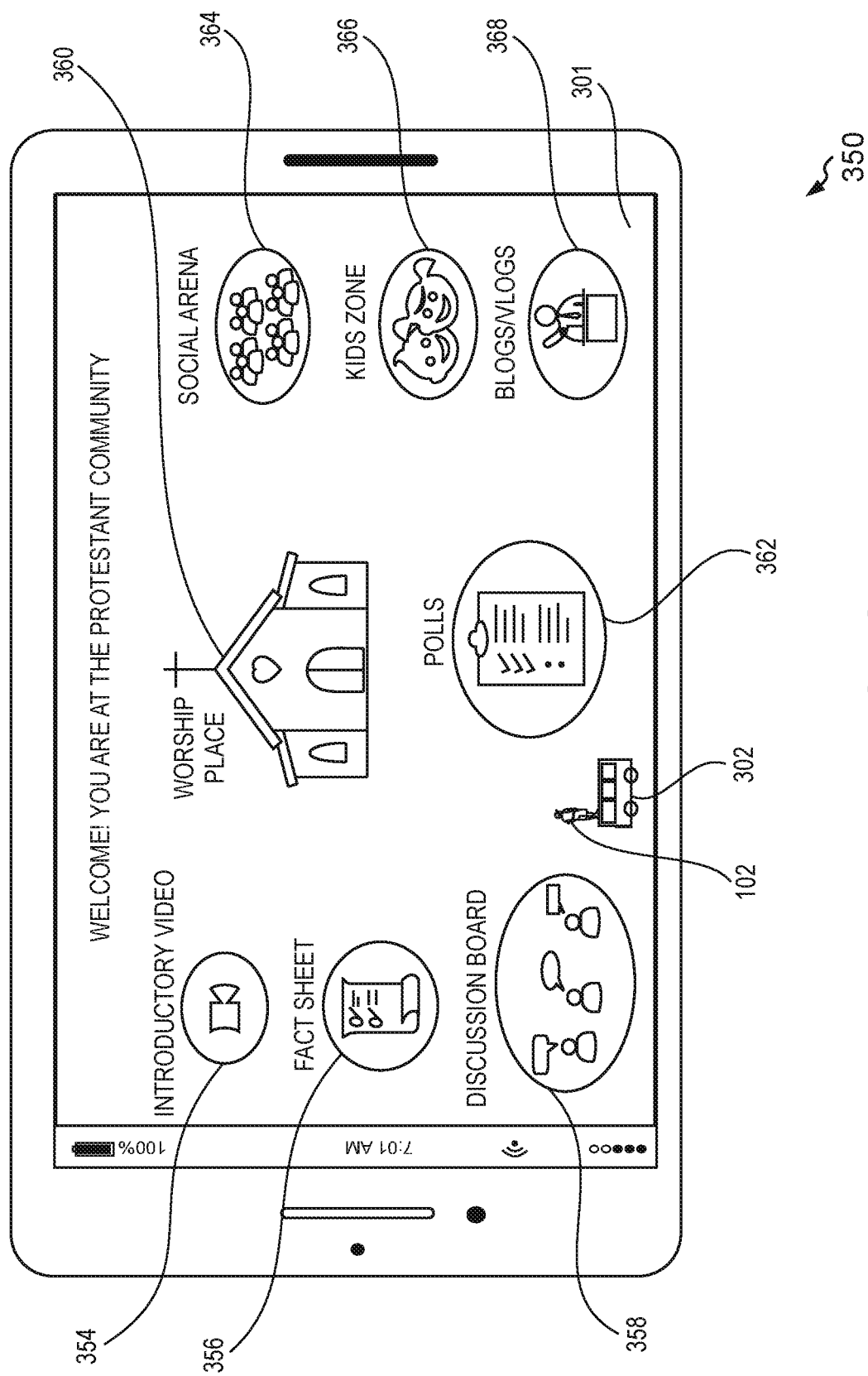
FIG. 3C illustrates an example representation of a UI displayed to a user of an electronic device by an interactive ideology exploration application for exploring a region associated with at least one ideology attribute of the plurality of ideology attributes on an interactive map based on a user preference, in accordance with an embodiment of the present disclosure.

FIG. 3C illustrates an example representation of a UI 350 displayed to the user of the electronic device by the interactive ideology exploration application 105 for exploring a region associated with at least one ideology attribute of the plurality of ideology attributes on the interactive map based on a user preference, in accordance with an embodiment of the present disclosure. The UI 350 is presented to the user 102 in response to a click input on the location icon 334 shown in FIG. 3B.

The UI 350 is depicted to display a header portion and a content portion. The header portion is depicted to include a title associated with text 'WELCOME JOE! YOU ARE AT THE PROTESTANT COMMUNITY'.

The content portion of the UI 350 depicts a plurality of options, such as option 354, 356, 358, 360, 362, 364, 366 and 368 related to exploring an ideology attribute (i.e., Protestant) for viewing a video of the ideology attribute (shown as 'INTRODUCTORY VIDEO', fact sheet of the ideology attribute (shown as 'FACT SHEET'), an arena to exchange views (shown as 'DISCUSSION BOARD'), a place to gather (shown as 'WORSHIP PLACE'), recording an opinion of users (shown as TOLLS'), community events associated with the ideology attribute (shown as 'SOCIAL ARENA'), ideology material for children (shown as 'KIDS ZONE'), and a podium to present views (shown as 'BLOGS/ VLOGS'), respectively. It is noted that the options 354-368 are shown herein for illustration purpose and that the UI 350 may include more or fewer options than those depicted in the content portion.

Figure 4A:
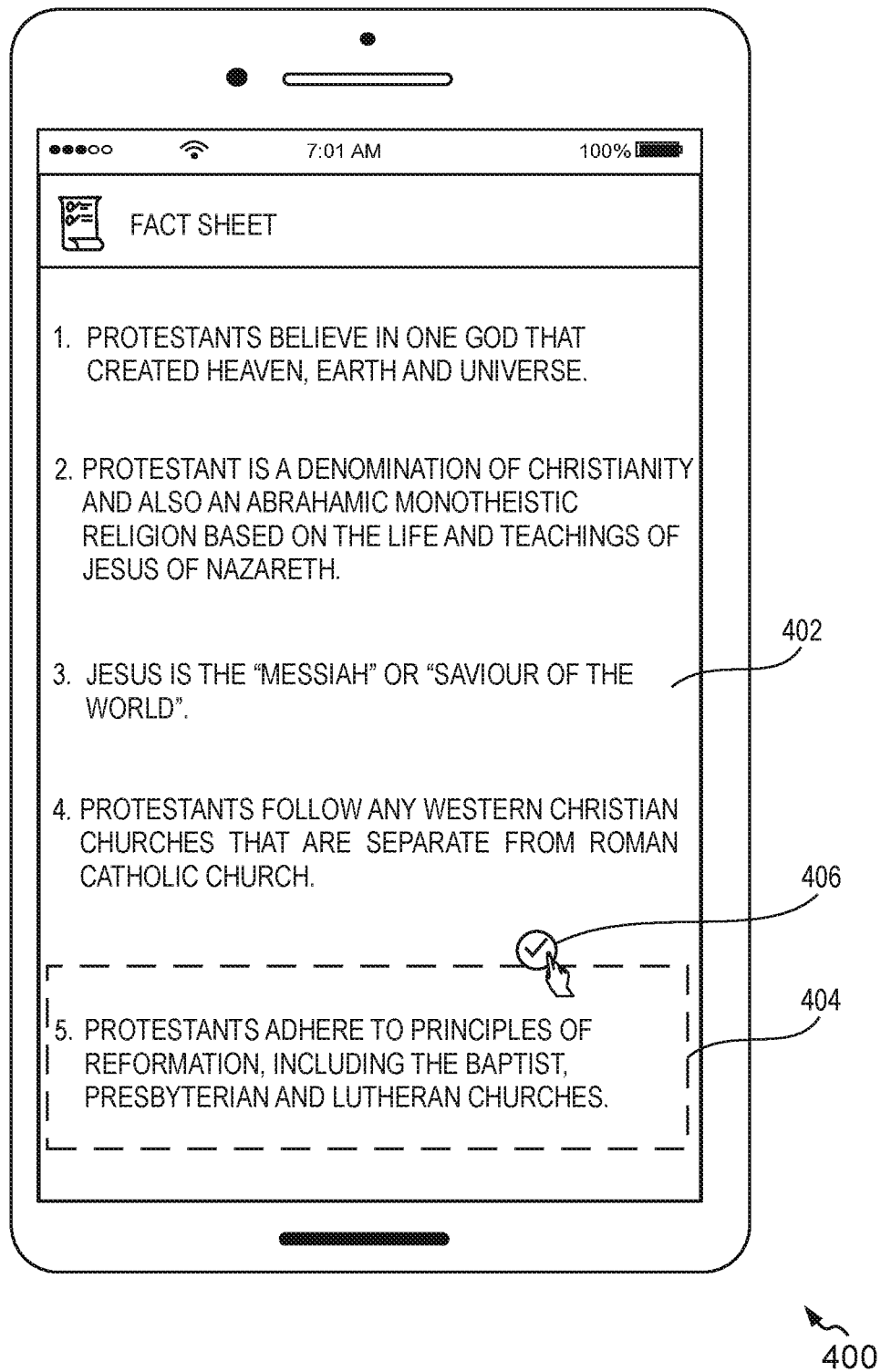
FIG. 4A illustrates an example representation of a UI displayed to a user of an electronic device by an interactive ideology exploration application for facilitating selection of at least one portion of a media item associated with an ideology attribute for determining authenticity, in accordance with an embodiment of the present disclosure.

The option 354 enables playback of an introductory video highlighting main pillars of the ideology attribute (i.e., religious/political). In one non-limiting example, the user 102 may be presented with options 'VISIT' or 'RESIDE' (not shown in FIG. 3A) on entering a region. When the user 102 provides an touch/click input on either of the options, the introductory video is played back to the user 102. The introductory videos may have transcripts in different languages to cater to linguistically diverse community. The selection of option 356 displays a fact sheet including true information that may be used as evidence. Additionally, the fact sheet also includes demographic information of the region (e.g., population in that region). Moreover, the selection of the option 356 may cause display of another UI provisioning options for selecting at least a portion of the fact sheet for determining authenticity of the portion. An example UI provisioned on the electronic device 104 when the user 102 provides the click input on the option 356 is shown in FIG. 4A.

The option 358 enables the user 102 to discuss and compare ideology attributes. More specifically, the user 102 can perform actions, for example, post questions, receive responses, post media items, respond to questions, etc., to explore, understand and share information with members about the ideology attribute on the discussion board. In other words, users of the interactive map can engage in healthy conversations to exchange views and perspectives of an ideology attribute on the discussion board. The selection of option 360 displays a virtual gathering place for believers of the ideology attribute to worship. In this example representation, a spiritual leader (e.g., Priest) leads worship in the virtual worship place (e.g., Church). It shall be noted that in a region associated with a political ideology, the virtual gathering may be a Parliament where elected representatives meet for starting petitions, and discussing bills (i.e., editing/criticizing/opposing bills).

The option 362 enables the user 102 to create and/or participate in polls/surveys on different social, ethical, philosophical, political and religion-related subjects. Additionally, when the user 102 provides a touch/click input on the option 362, the user 102 may be provided with media items (e.g., articles, reference material in form of web links/URLs, videos, etc.) that aid and guide the user 102 to make informed decisions while participating in polls/surveys. Specifically, the media items in the poll section include supporting facts, evidence and general public opinion related to the poll. However, it should be noted that if the user 102 moves away from the region (i.e., changes his residency to a different region associated with a different ideology attribute), the vote/poll responses of the user 102 will be voided. Therefore, only residents of a region can participate in polls hosted in a region.

The selection of option 364 may cause display of another UI provisioning options for selecting community activities related to that ideology attribute, for example, community events, e-debates, fundraisers, entertainment programs, etc., Moreover, each of the activities can be endorsed by any users (i.e., resident of that region or any other region). The option 366 enables the user 102 to access media items for young children that facilitate them to understand main pillars of the ideology attribute and practice other customs associated with the ideology attribute. For example, the media items may be interactive and age appropriate for kids, for example, cartoons, interactive media content and basics of the ideology attribute that help the children learn more about the ideology attribute. In one embodiment, the media items displayed to the user 102 are classified based on age. For instance, if the user 102 of the interactive map 301 is a 10 year old, then he/she can access only the kids zone (shown by the option 366) and all other options (i.e., 354, 356, 358, 360, 362, 364, and 368) will be disabled for the user 102. The selection of option 368 may cause display of another UI depicting a list of blogs/vlogs posted by users who reside in the corresponding region. The blogs/vlogs may include snippets of interesting information or videos of community activities performed by the residents of that region.

It shall be noted that the UI 350 may include fewer or more options for the user 102 to explore an ideology attribute than those depicted in FIG. 3C. Further, the interactive ideology exploration application 105 provides the user 102 an option to check authenticity of any portion of media item or the entire media item. The selection of any portion of a media item for determining content accuracy is shown in FIG. 4A.

Referring now to FIG. 4A, an example representation of a UI 400 displayed to the user of the electronic device 104 by the interactive ideology exploration application 105 for facilitating selection of at least one portion of a media item associated with an ideology attribute for determining authenticity is illustrated in accordance with an embodiment of the present disclosure. The UI 400 is presented to the user 102 in response to a click input on the option 356 shown in FIG. 3C.

The UI 400 is depicted to display a header portion and a content portion. The header portion is depicted to include a title associated with text 'FACT SHEET'.

The content portion of the UI 400 depicts facts of the ideology attribute (i.e., Protestant-Christianity). The fact sheet 402 displays doctrines and/or information that have evidence. Additionally, the fact sheet 402 includes details of that region, for example, demographic information. Any of the users of the interactive ideology exploration application 105 can view the fact sheet 402 of the ideology attribute and request for a fact check.

In this example representation, the user 102 selects a portion 404 of the fact sheet 402. When the user 102 provides a selection input on the portion 404, an authenticity check option 406 appears beside the selected text (i.e., the portion 404). The authenticity check option 406 enables the user 102 to perform at least one action (i.e., based on user preference) to verify the correctness of the portion 404 in the fact sheet 402. For instance, the selection of the authenticity check option 406 causes display of another UI which displays payment information for requesting fact-check of the selected portion 404. An example UI provisioned to the user 102 when the user 102 provides the click input on the authenticity check option 406 is shown in FIG. 4B.

Figure 4B:
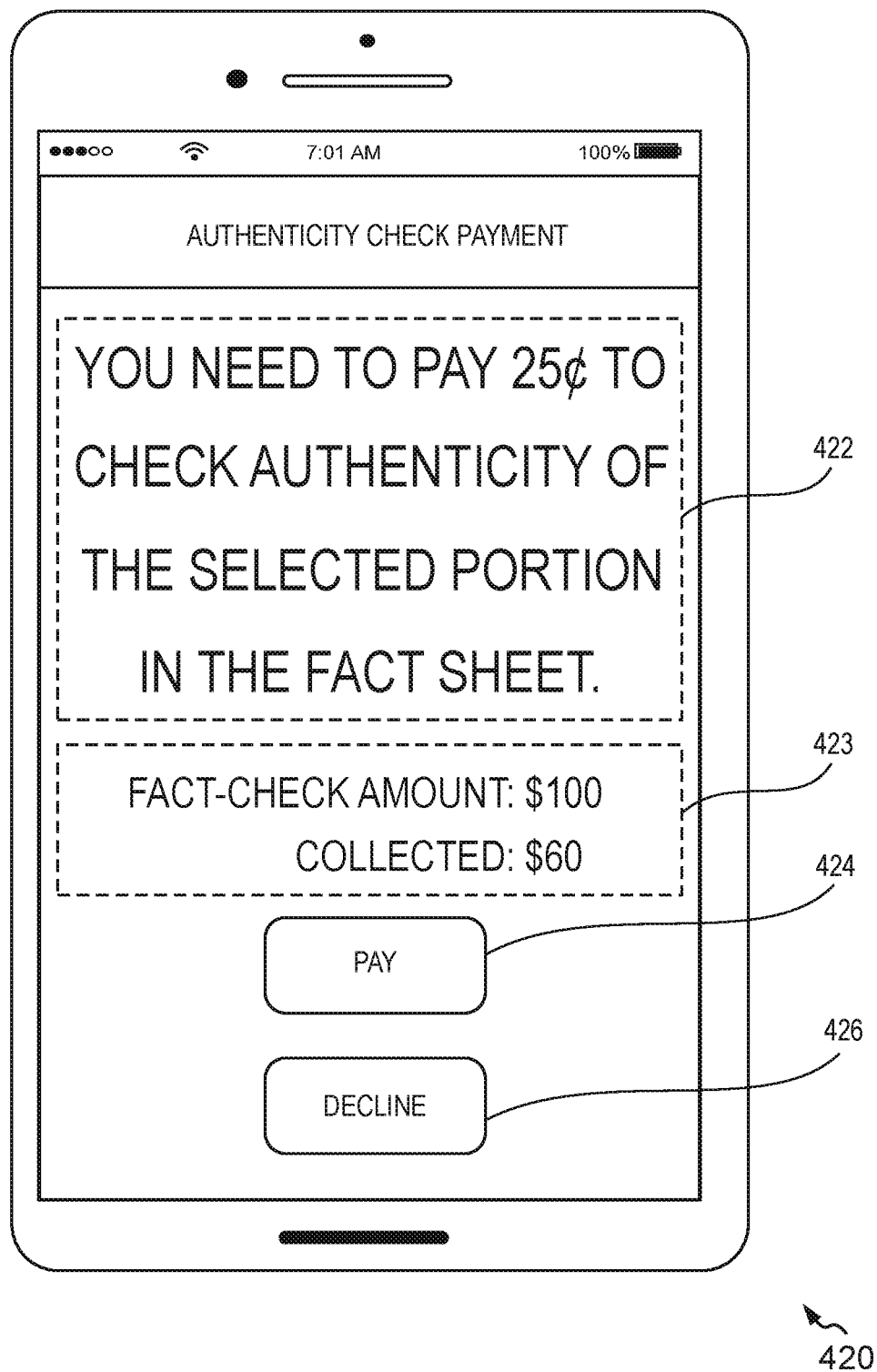
FIG. 4B illustrates an example representation of a UI displayed to a user of an electronic device by an interactive ideology exploration application for making at least a part payment to determine authenticity of at least one portion of a media item associated with an ideology attribute, in accordance with an embodiment of the present disclosure.

FIG. 4B illustrates an example representation of a UI 420 displayed to the user of the electronic device 104 by the interactive ideology exploration application 105 for making at least a part payment to determine authenticity of at least one portion 404 of a media item associated with an ideology attribute, in accordance with an embodiment of the present disclosure. The UI 420 may be presented on the electronic device 104 in response to the click input/touch received on the authenticity check option 406 shown in FIG. 4A.

The UI 420 is depicted to display a header portion depicted to include a title associated with text 'AUTHENTICITY CHECK PAYMENT'.

The content portion of the UI 420 is depicted to display charges (i.e., payment amount) for performing a fact-check of the selected portion 404 and a status of the authenticity check. In this example representation, the content portion displays a text 422 'YOU NEED TO PAY 25¢ TO CHECK AUTHENTICITY OF THE SELECTED PORTION IN THE FACT SHEET'. The status of the authenticity check provides an insight for the user 102 on a payment amount (i.e., total payable amount) for checking authenticity and amount collected so far from other users who desire to check authenticity of the same selected portion 404. This is shown by a text 423 as shown below

"FACT_CHECK AMOUNT: $100
COLLECTED: $60"

The content portion of the UI 420 is further configured to depict a tab 424 associated with text TAY' and a tab 426 associated with text 'DECLINE'. The user 102 may provide a touch or a click input on the tab 424 to initiate the payment transaction. The selection of the tab 424 may cause display of another UI that collects payment information for processing the transaction. More specifically, the user 102 can buy credit from the ideology exploration application 105 that he/she can use to pay for the authenticity check. Additionally, the part payment of the user from his/her credit is kept on hold till the experts provide a report for the authenticity check. The user 102 may cancel the payment/fact check request upon providing a click input/touch on the tab 424.

It is noted that the fields are shown herein for illustration purpose and that the UI 420 may include more of fewer fields than those depicted in the content portion. Moreover, the UI 420 may be presented as an overlay to the user 102 of the interactive ideology exploration application to notify him/her of the payment charges. After the payment process, the selected portion 404 is sent to experts in different disciplines for examining the selected portion 404 and verifying the correctness of the selected portion based on pre-existing evidence. In one embodiment, when a sentence of a written post (i.e., responses on discussion board, articles or transcripts of introductory videos/videos, debate claims) reaches a certain number of fact-check, then the selected portion 404 is sent for fact-check.

Figure 4C:
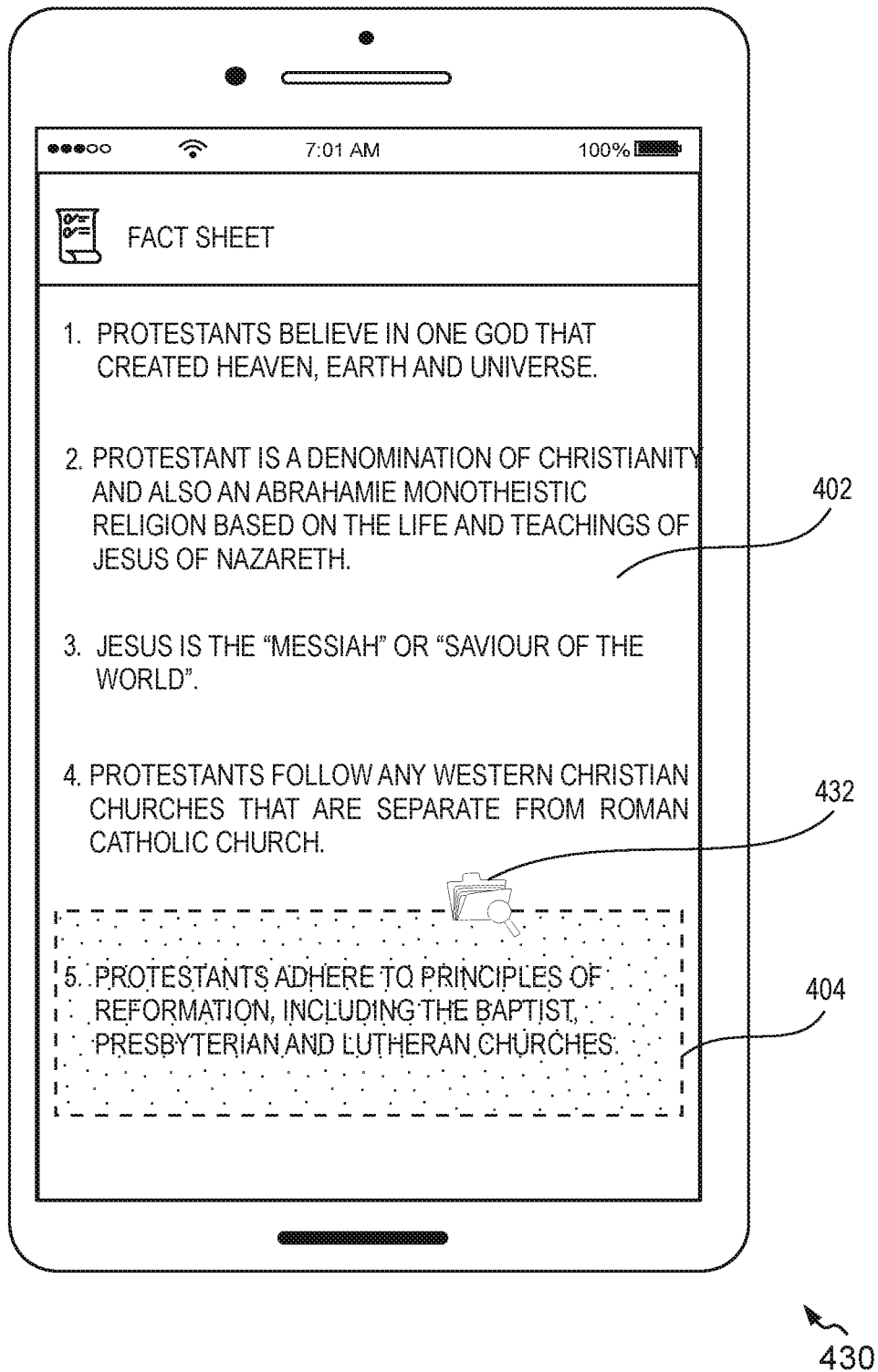
FIG. 4C illustrates an example representation of a UI displayed to a user of an electronic device by an interactive ideology exploration application for displaying a color code on at least one portion of a media item associated with an ideology attribute based on the authenticity, in accordance with an embodiment of the present disclosure.

As shown in FIG. 4C, when the experts (e.g., the experts 110) analyze and provide a feedback for the selected portion 404, a report icon 432 is displayed beside the selected portion (see, UI 430). Additionally, the selected portion 404 is displayed with a color code (e.g., font color of selected portion 404 is changed) indicating a content accuracy of the selected portion 404. In one non-limiting example, the color code indicates one of a false claim, a true claim, a controversial claim leans to be wrong, controversial claim leans to be true, fact check pending and non-fact checkable. In an embodiment, the opinions of the experts will be automatically merged to determine an authenticity score for the selected portion. Further, a color code may be displayed on the selected portion based on the authenticity score.

Figure 4D:
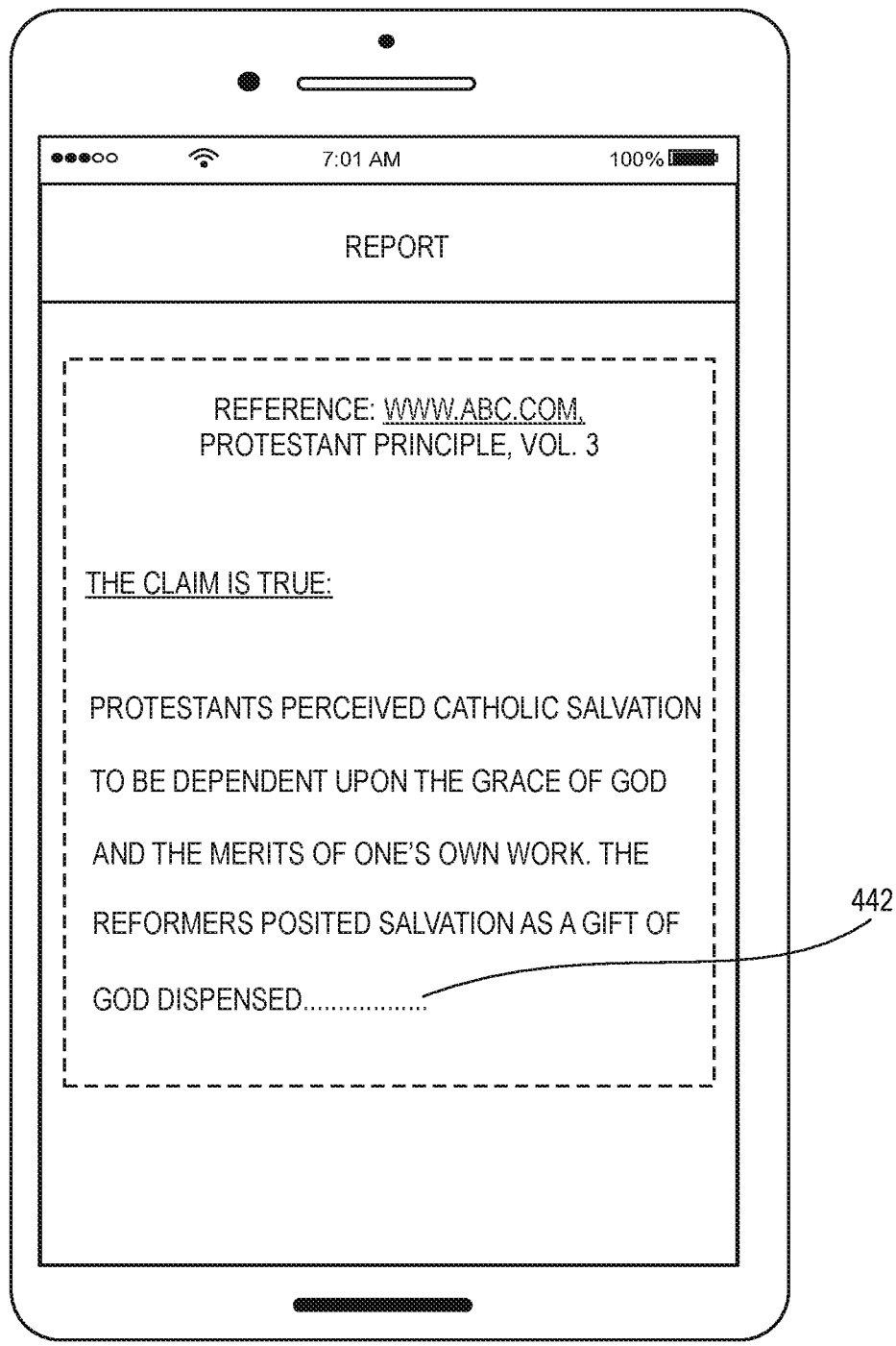
FIG. 4D illustrates an example representation of a UI displayed to a user of an electronic device by an interactive ideology exploration application depicting a report based on the authenticity of the at least one portion of a media item associated with an ideology attribute, in accordance with an embodiment of the present disclosure.

FIG. 4D illustrates an example representation of a UI 440 displayed to the user 102 of the electronic device 104 by the interactive ideology exploration application 105 depicting a report 442 based on the authenticity of the at least one portion of a media item associated with an ideology attribute, in accordance with an embodiment of the present disclosure. The UI 440 may be presented on the electronic device 104 in response to the click input/touch received on the report icon 432 shown in FIG. 4C.

The UI 440 is depicted to display a header portion depicted to include a title associated with text 'REPORT'.

The content portion of the UI 440 is depicted to include the report 442 that provides a detailed analysis of the selected portion 404 based on pre-existing evidence. Further, the report 442 includes references quoting the evidences for deciding the authenticity of the claim (i.e., the selected portion 404). More specifically, the report 442 includes evidences that support the color code provided for the selected portion 404. It shall be noted that the report 442 is consolidated and presented to the user 102 if reports are examined by multiple experts.

The report 442 can be used as a basis for writing articles, posting answers, or presenting arguments in the discussion board/debates related to the ideology attribute. An example of the report 442 quoted in a discussion is shown in FIG. 4E.

Figure 4E:
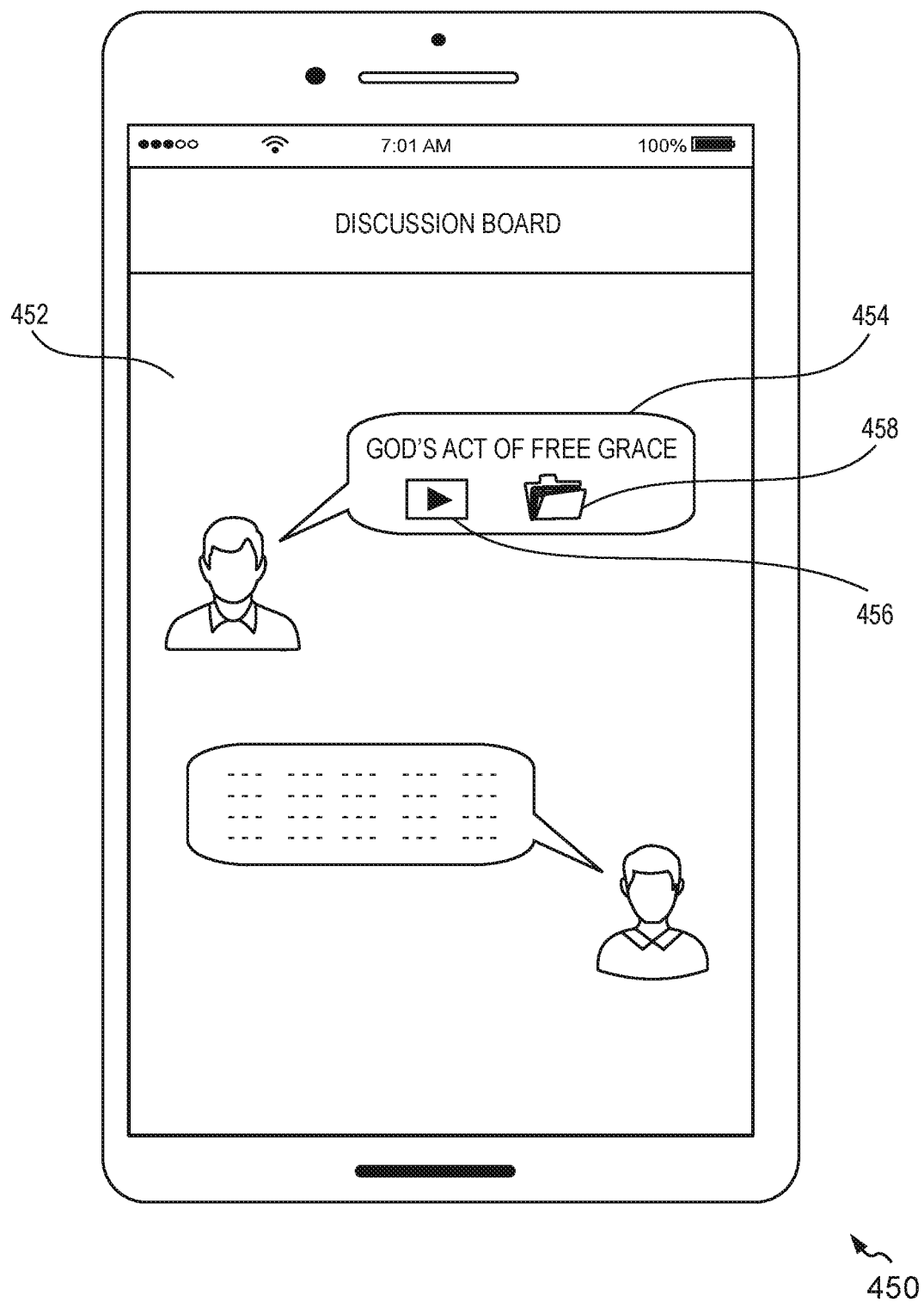
FIG. 4E illustrates an example representation of a UI displayed to a user of an electronic device by an interactive ideology exploration application depicting a media item of an ideology attribute including a reference to the at least one portion of the media item with the color code and the report, in accordance with an embodiment of the present disclosure.

FIG. 4E illustrates an example representation of a UI 450 displayed to the user of the electronic device 104 by the interactive ideology exploration application 105 depicting a media item 456 of an ideology attribute including a reference to the at least one portion of the media item with the color code and the report, in accordance with an embodiment of the present disclosure. The UI 450 may be presented on the electronic device 104 in response to the click input/touch received on the option 358 shown in FIG. 3C.

The UI 450 is depicted to display a header portion that includes a title associated with text 'DISCUSSION BOARD'.

The content portion of the UI 450 is depicted as a discussion board 452 associated with the ideology attribute (e.g., Protestant). The discussion board 452 includes conversation between users of the interactive map 301 on diverse topics related to the ideology attribute. In this example representation, the user 102 posts the media item 456 (e.g., a video) as shown by conversation 454. Additionally, the discussion board 452 includes an option (not shown) to attach or add a reference for the posted material (i.e., the media item 456). The user 102 may add the report 442 to support content posted in the media item 456. In an embodiment, the user 102 may have to pay for quoting the reference of a fact-checked material. For example, the user 102 chooses to add the reference, he may be prompted to a payment page that processes a payment (e.g., $10) for quoting the reference (i.e., report) that includes media item that was previously checked for authenticity. As shown in FIG. 4E, the conversation 454 includes a reference icon 458 and when a touch/click input is provided on the reference icon 458, any user may be presented with the UI 440 that displays supporting evidence for a portion of a media item (i.e., fact sheet) that was fact-checked and has been used as a basis/supporting evidence in the media item 456. Such provisions of adding reference to fact-checked data provides credentials for the media item 456 posted in the conversation 454.

Figure 5A:
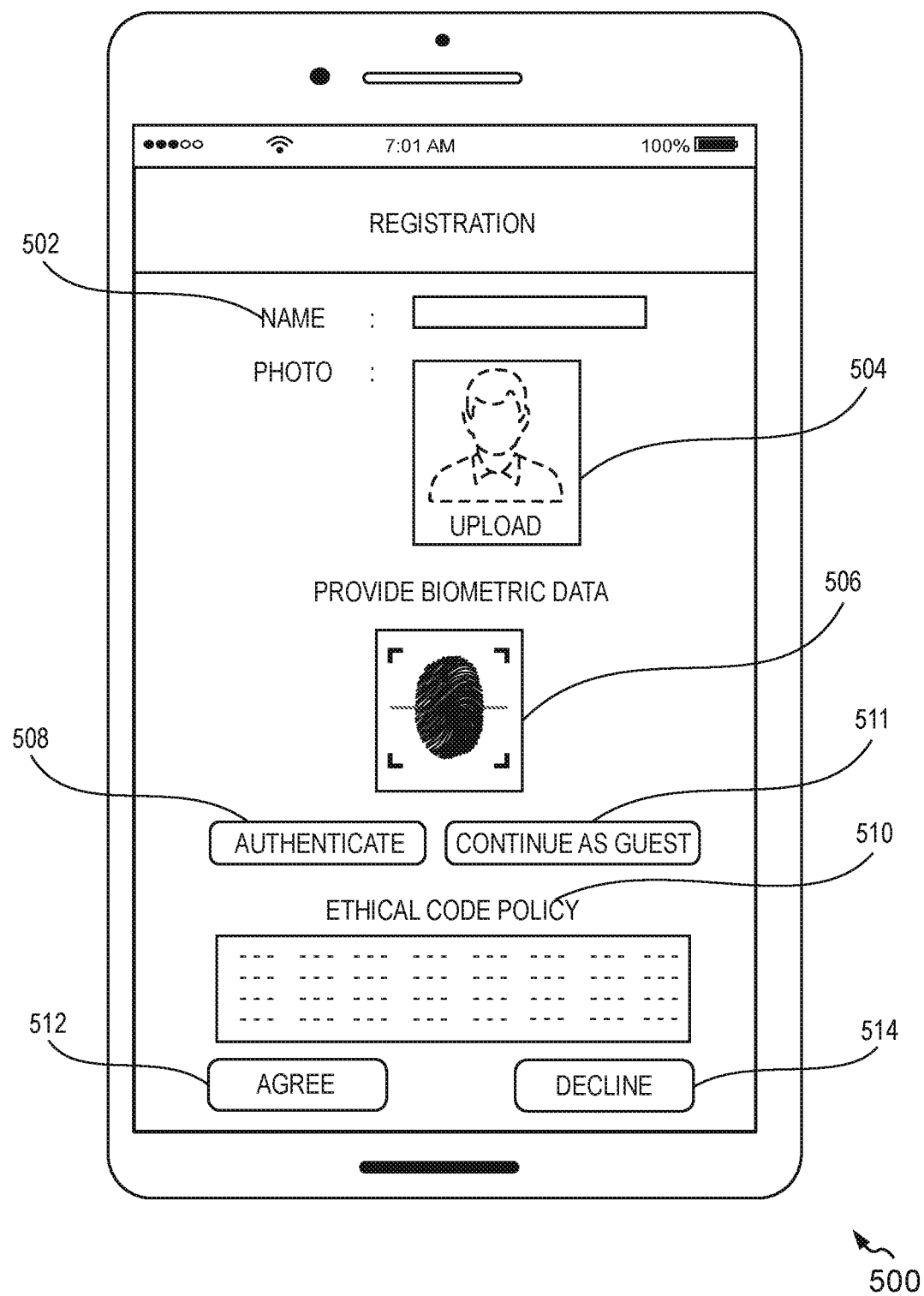
FIG. 5A illustrates an example representation of a UI displayed to a user of an electronic device by an interactive ideology exploration application for registration of the user with the interactive ideology exploration application, in accordance with an embodiment of the present disclosure.

FIG. 5A illustrates an example representation of a UI 500 displayed to the user 102 of the electronic device 104 by the interactive ideology exploration application 105 for registration of the user 102 with the interactive ideology exploration application 105, in accordance with an embodiment of the present disclosure. In at least example embodiment, the UI 500 is presented by the interactive ideology exploration application 105. The interactive ideology exploration application 105 is a software application facilitated by the server system 108 or the ideology exploration system 114.

In an example scenario, after downloading of the interactive ideology exploration application 105 from the server system 108 (shown in FIG. 1), an application icon may be displayed to the user 102 on a display screen of the electronic device 104. The application icon is not shown in FIG. 5A. The user 102 may provide a selection input on the application icon to invoke the interactive ideology exploration application 105. The interactive ideology exploration application 105, after invoking, may present one or more UIs (e.g., the UI 500) for registration of the user 102 (i.e., creating a user account) with the interactive ideology exploration application 105.

The UI 500 is depicted to include a header portion and a content portion. The header portion is depicted to exemplarily display a title associated with text 'REGISTRATION'.

The content portion of the UI 500 is depicted to display fields such as user name (shown as 'NAME'), a picture of the user 102 (shown as 'PHOTO'), and a biometric data of the user 102 (shown as 'PROVIDE BIOMETRIC DATA'). The field 'NAME' is associated with a text box 502, the field 'PHOTO' is associated with an option 504 to upload/capture an image and the field 'PROVIDE BIOMETRIC DATA' is associated with an option 506 to provide any user specific data (e.g., fingerprint).

The user 102 may provide a name in the text box 502. In an example, the user 102 can provide a real name or a nick name in the text box 502. Moreover, the user 102 can switch between a real name and nick names while using the interactive ideology exploration application 105. However, the real name of the user 102 is stored for auditing or verification process. The option 504 enables the user 102 to capture/upload an image. If the image depicts the user 102 as certified by him/her, the image is stored for verification processes. It shall be noted that adding an image for registration is optional and the user 102 may choose not to provide an image. The option 506 enables the user 102 to provide a biometric data for authentication. The user 102 can choose to provide any biometric data, for example, fingerprint, facial features, voice samples that uniquely identify the user 102 by accessing the option 506. The UI 500 includes an option 508 associated with text 'AUTHENTICATE'. When the user 102 clicks on the option 508 after providing biometric data, a digital code is generated by the third-party server 112 that stores the digital code for authenticating the user 102 every time he/she accesses the interactive ideology exploration application 105. Further, the UI 500 includes an option 511 associated with text 'CONTINUE AS GUEST' that enables a user to access the ideology exploration application 105 without authentication. More specifically, these unregistered users (i.e., non-members) who don't provide authentication data can explore ideology attributes but have no privileges to participate in activities (e.g., polls, discussions), endorse activities or reside in a region. The content portion of the UI 500 includes a section 510 associated with text 'ETHICAL CODE POLICY'. The section 510 defines a plurality of moral and ethical rules indicating offences and corresponding penalty for the user 102 on violation. The content portion of the UI 500 is further configured to depict a tab 512 associated with text 'AGREE' and a tab 514 associated with text 'DECLINE'. The user 102 may provide a touch or a click input on the tab 512 to agree to the ethical code policy quoted in the section 510. It shall be noted that even non-members (i.e., guest users) have to provide a consent to the ethical code policy for accessing the ideology exploration application 105. Further, the user 102 may be presented with a home page of the interactive ideology exploration application 105 depicting the interactive map 301 as shown in FIG. 3A. The user 102 may decline to agree to the ethical code policy by providing a click/touch input on the tab 514. It is noted that the provisioning of the 'REGISTRATION' option is explained herein for illustration purposes and may not be considered as limiting the scope of the disclosure.

Figure 5B:
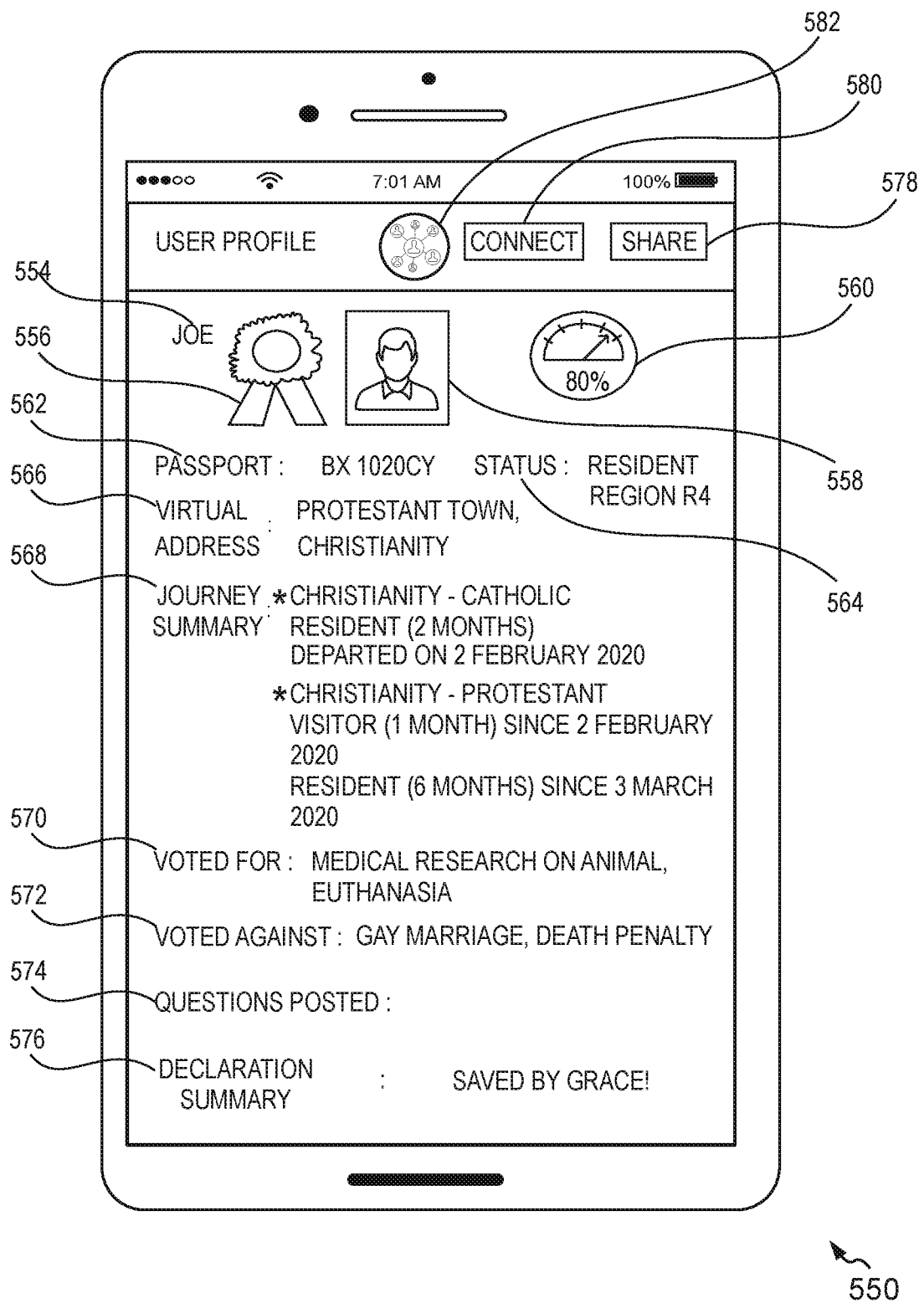
FIG. 5B illustrates an example representation of a UI displayed to a user of an electronic device by an interactive ideology exploration application depicting a user profile of the user, in accordance with an embodiment of the present disclosure.

FIG. 5B illustrates an example representation of a UI 550 displayed to the user 102 of the electronic device 104 by the interactive ideology exploration application 105 depicting a user profile of the user 102, in accordance with an embodiment of the present disclosure.

The UI 550 is depicted to include a header portion and a content portion. The header portion is depicted to exemplarily display a title associated with text 'USER PROFILE'.

The content portion of the UI 550 is depicted to display fields such as, a user name 554 (shown as 'JOE'), a reward (shown by a reward icon 556), an image 558 of the user 102 (shown as 'PHOTO'), an authenticity measure (shown by a fact meter 560), a user identifier 562 (shown as 'PASSPORT'), a residency status 564 of the user 102 (shown as 'STATUS'), a location on the interactive map 566 (shown as 'VIRTUAL ADDRESS'), a movement information on the interactive map 568 (shown as 'JOURNEY SUMMARY'), a moral compass information 570, 572 (shown as 'VOTED FOR' and 'VOTED AGAINST', respectively), a discussion board participation information 574 (shown as 'QUESTIONS POSTED'), and a declaration section 576 (shown as 'DECLARATION SUMMARY').

The user 102 may provide a real name or a nick name in the text box 502. Moreover, the user 102 can switch between a real name and nick names while using the interactive ideology exploration application 105. The reward icon 556 appears on the user profile of the user 102 when the fact authenticity score (shown by the fact meter 560) is greater than a threshold score. The user 102 can collect many such rewards that appear in his/her user profile. In one non-limiting example, if the user 102 is an active participant in discussions of the discussion board (see, 450 in FIG. 4E), for example, he has answered 25 questions with an accuracy of 80% and participated in 2 debate sessions where 90% of his debate material was accurate when fact-checked, then his fact meter 560 shows 85%. Moreover, based on individual fact authenticity score, the user 102 may be provided 2 rewards. For example, if the user 102 is a blogger, he may be provided a reward when subscribers of the blog exceed a value (e.g., 5000) and authenticity score is high (e.g., 85%). The reward may appear as a podium certification seal or a gold/silver microphone award on the user profile of the user 102. Optionally, the user 102 can capture/upload an image in the field 558.

The user identifier 562 enables the ideology exploration system 200 to track a journey of the user 102 on the interactive map. The residency status 564 of the user 102 can be 'Visitor' indicating that the user is exploring a region (i.e., ideology attribute) or 'Resident' indicating that the user 102 believes in an ideology attribute shown by the field 566 (shown as 'VIRTUAL ADDRESS'). The current location (i.e., region) of the user 102 on the interactive map either if he is visiting/staying is shown as the virtual address in the field 566. The field 568 depicting 'JOURNEY SUMMARY' gives a brief overview of the movement of the user 102 on the interactive map. More specifically, regions the user 102 travelled to for visiting/exploring or residing are presented in the field 568.

The moral compass information 570, 572 states where the user 102 stands in social, ethical, philosophical, religious survey. As shown in UI 550, the user profile depicts the surveys the user voted for (e.g., medical research on animal, Euthanasia) and user voted against (e.g., gay marriage, death penalty) indicating user viewpoints in social and ethical causes. The discussion board participation information 574 includes information, such as, questions posted, answers posted, fact authenticity score for answers posted, etc. The declaration section field 576 enables the user 102 to post and express his own beliefs and his main convictions.

The header portion of the UI 550 is further configured to depict a tab 578 associated with text 'SHARE', a tab 580 associated with text 'CONNECT' and a tab 582. The user 102 may provide a touch or a click input on the tab 578 to share the user profile on any social networking site, for example, Facebook®. The tab 580 enables the user 102 to connect with users who share same interests. When the user 102 provides a touch/click input on the tab 580, a UI may be generated with suggestions of users of the application 105 who have same/similar ideologies/interests. The tab 582 enables the user to build communities or create a network of users who share same ideologies, social interests or viewpoints. More specifically, the user 102 manages the people he/she connects with by providing a click/touch input on the tab 582. It is noted that the user profile of the user 102 is explained herein for illustration purposes and the user profile may include fewer or more fields than those shown and described with reference to FIG. 5B.

It must be noted that the profile information provided by the user 102 are not fixed and the user 102 can choose to update fields 554, 558 and 576. Moreover, the user 102 is constantly tracked using the user identifier 562 (i.e., PASSPORT) and the fields 560, 564, 566, 568, 570, 572, 574 in the user profile shown in UI 550 are updated based on the tracking. Additionally, the user 102 can manage the user attributes of the user profile, for example, the user 102 can modify settings to share only few user attributes of the user profile with other users of the application 105.

Figure 6A:
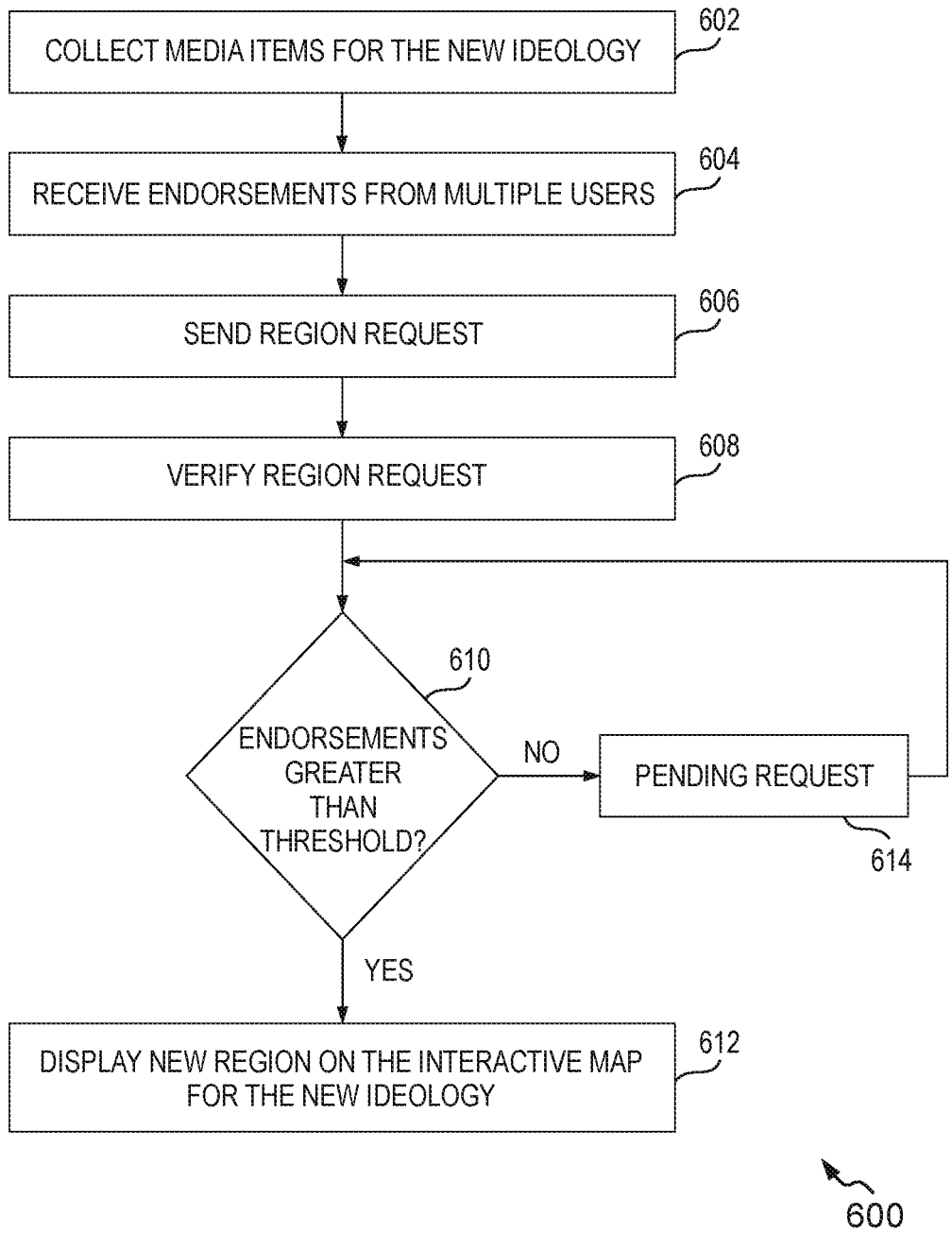
FIG. 6A represents a flow chart of a process flow for displaying a new region associated with a new ideology attribute on the interactive map, in accordance with an embodiment of the present disclosure.

FIG. 6A represents a flow chart 600 of a process flow for displaying a new region associated with a new ideology attribute on the interactive map, in accordance with an embodiment of the present disclosure. The sequence of operations of the flow chart 600 may not be necessarily executed in the same order as they are presented. Further, one or more operations may be grouped together and performed in form of a single step, or one operation may have several sub-steps that may be performed in parallel or in a sequential manner.

At 602, media items for the new ideology attribute are collected. More specifically, the media items should include at least an introductory video and a fact sheet of the ideology attribute highlighting main pillars of faith, belief, or doctrines. Moreover, if the new ideology attribute forms a subsection of a larger ideology attribute, then belief or doctrines of this subsection (i.e., new ideology attribute) must be aligned with the belief and doctrines of the larger ideology attribute of which they are part. Accordingly, the media items of the new ideology attribute must be aligned with the larger territory (i.e., region) of which it will be a part. The media items may be collected from multiple users who endorse creation of the new ideology attribute. Alternatively, a user who is convinced of his/her new beliefs may create media items for the new ideology attribute.

At 604, endorsements are received from multiple users of the interactive map for the new ideology attribute. As already explained, a user or a group of users may join together in creating a new ideology attribute. The details pertaining to the new ideology attribute may either be advocated at a common place (e.g., central public region 304) or may be birthed as a result of discussion in a discussion board of a region. In some embodiments, the new ideology attribute may be advocated or advertised on the interactive map in all the regions. The users of the interactive ideology exploration application 105 are facilitated with an option to endorse the new ideology attribute. For instance, if the user 102 is a resident of a region associated with Christianity—Protestant but convinced by the new ideology attribute (e.g., Pentecost) or if he finds it interesting, the user 102 may endorse the new ideology attribute. However, it shall be noted that the user 102 must be resident of any region or a 'searcher' to endorse the new ideology attribute.

At 606, the user or a group of users send a region request for a creating a new region associated with the new ideology attribute on the interactive map. The region request includes at least a region specification, ideology attribute information, one or more media items for the new ideology attribute and a plurality of endorsements from users associated with the interactive map. The region specification defines a location on the interactive map where the new region will be created. More specifically, the user(s) can request land (i.e., new region) for an unmapped town inside a main territory (i.e., Islam) or claim an empty land that exists between pre-existing territories near to closest region the ideology attribute they are closely related. However, if the region specification indicates a land within a main territory, the belief of the new ideology attribute must align with the main territory's belief and the region request must receive an approval from elected representatives of that main territory (e.g., board), or enough endorsements from the residents of the main territory. In one non-limiting example, the user may circle a part of interactive map to indicate the new region associated with the new ideology attribute.

At 608, the region request is verified. For instance, if the new region is part of a main territory (i.e., region), the ideology exploration system 200 examines if the belief of the new ideology attribute aligns with the main territory's belief and if the region request has been approved by elected representatives of the main territory. Additionally, the media items of the new ideology attribute are analyzed to ensure that the new ideology attribute does not promote hatred or violence among the users of the interactive ideology exploration application 105.

At 610, the processor 206 is configured to check if a number of endorsements are greater than a threshold. When the number of endorsements is greater than the threshold, step 612 is performed else step 614 is performed.

At 612, the new region is displayed on the interactive map for the new ideology attribute. When a significant number of users endorse the new ideology attribute and when the region request is verified, the new region associated with the new ideology attribute appears on the interactive map. At 614, the region request remains pending till the number of endorsements is greater than the threshold.

Figure 6B:
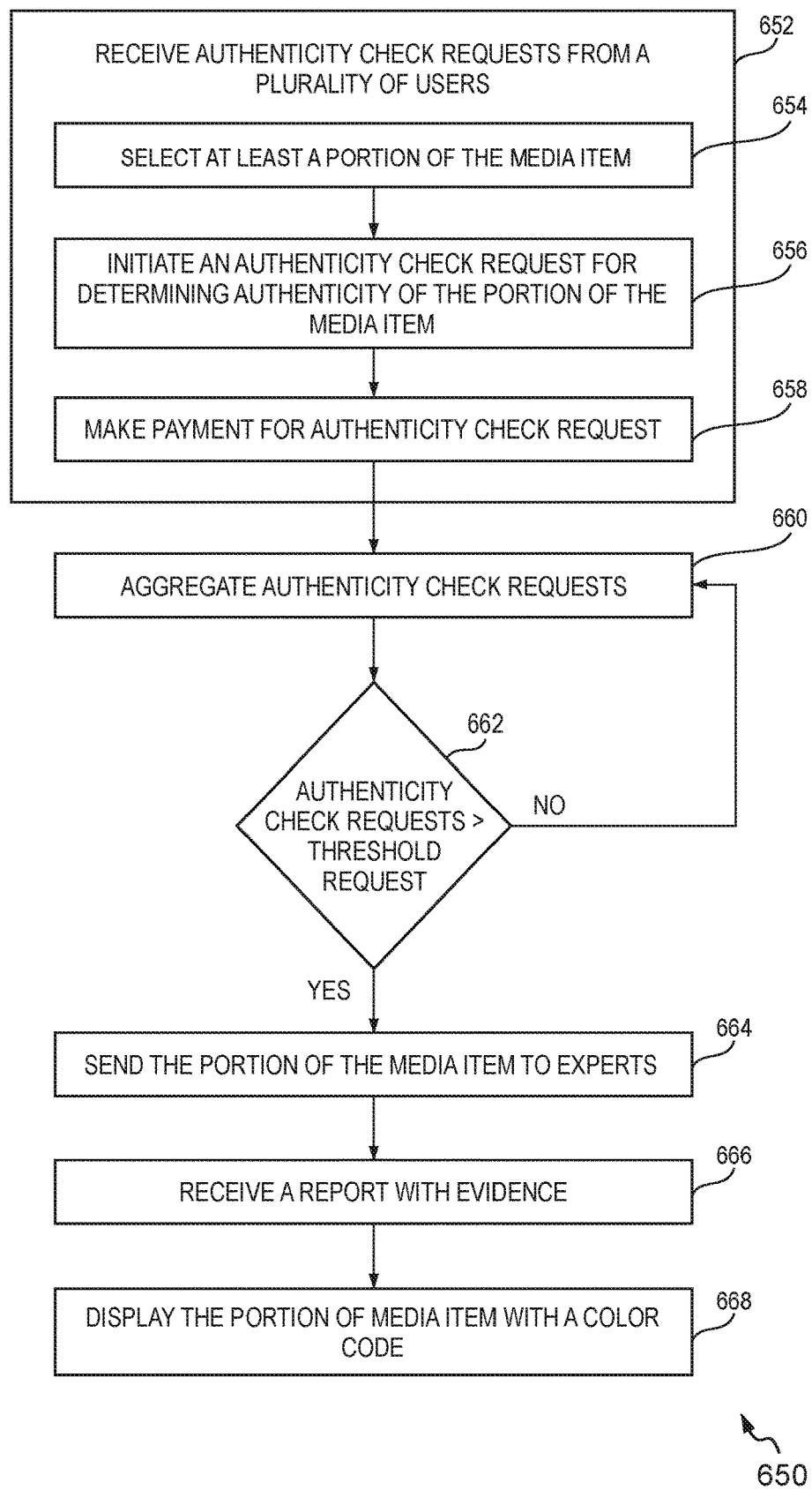
FIG. 6B represents a flow chart of a process flow for displaying a color code on at least a portion of the media item based on authenticity, in accordance with an embodiment of the present disclosure.

FIG. 6B represents a flow chart 650 of a process flow for displaying a color code on at least a portion of the media item based on authenticity, in accordance with an embodiment of the present disclosure. The sequence of operations of the flow chart 650 may not be necessarily executed in the same order as they are presented. Further, one or more operations may be grouped together and performed in form of a single step, or one operation may have several sub-steps that may be performed in parallel or in a sequential manner.

At 652, the ideology exploration system 200 receives authenticity check requests from a plurality of users of the application 105. An authenticity check request is received from a user by performing operations 654-658.

At 654, the user 102 selects a portion of the media item. The media item may include any of, text, image, video, transcripts or any combination thereof. Moreover, the media item may be an introductory video, fact sheet, discussion thread, response posted, kids material, debate material, vlog/blog content, etc. It shall be noted that the user 102 can choose to check authenticity of the entire media item.

At 656, the user 102 initiates an authenticity check request for determining authenticity of the portion of the media item. For instance, on selecting a portion of the media item or the entire media item, the ideology exploration system 200 facilitates an option to check authenticity of the selected portion. An example of the option is shown and explained with reference to FIG. 4A.

At 658, the user 102 makes a part payment for the authenticity check request. The user 102 can choose to make a part payment for checking authenticity of the selected portion. More specifically, the ideology exploration system 200 may prescribe a fee (i.e., payment amount) for checking authenticity of different media item. In other words, the payment amount varies based on type of media item, length of the selected portion, etc., Accordingly, the payment amount is aggregated and collected from the plurality of users as part payments. For example, fact-check fee (i.e., the payment amount) for determining authenticity of a video may be $20. Accordingly, the payment amount is collected as $2/user (i.e., part payment) from 10 users who request a fact-check for the same video. When the user 102 makes a part payment, the authenticity check request of the user 102 is queued up for determining authenticity of the media item.

At 660, the processor 206 aggregates authenticity check requests from users who select the same media item/portion of media item. For example, authenticity check requests from users who intend to determine content accuracy of a statistical article related to an ideology attribute are aggregated together and authenticity check requests from users who intend to determine content accuracy of an answer posted by another user of the application 105 are aggregated together.

At 662, it is checked if the authenticity check requests associated with a media item are greater than a threshold requests. For example, the processor 206 checks if number of authenticity check requests associated with the statistical article are greater than the threshold requests (e.g., 5 requests). If the authenticity check requests exceed the threshold request, then operation 664 is performed, else operation 660.

At 664, the processor 206 is configured to send the portion of the media item to experts. Experts may include researchers in varied disciplines to verify the accuracy of the claim. At 666, the processor 206 receives a report with evidence from experts. In one embodiment, the processor 206 aggregates evidence from experts to generate the report for the selected portion. The report includes supporting evidence that was used as basis for determining the authenticity of the claim.

At 668, the processor 206 is configured to display a color code for the portion of the media item. In one embodiment, an authenticity score is determined for the selected portion based on the reports. For instance, each expert may grade the claim on a scale of 10 to denote the content accuracy based on corresponding discipline. The processor 206 aggregates the grades from all the experts to determine the authenticity score. The color code is displayed on the selected portion (i.e., portion of the media item) based on the authenticity score as shown below:

(a) authenticity score≥8, the selected portion is depicted with green color indicating a 'true claim'
(b) 5≥authenticity score≤7, the selected portion is depicted with light green color indicating a 'controversial claim that leans to be true'
(c) 3≥authenticity score≤4, the selected portion is depicted with pink color indicating a 'controversial claim that leans to be wrong'
(d) authenticity score≤2, the selected portion is depicted with red color indicating a 'false claim'
(e) The selected portion is depicted with blue color indicating 'authenticity-check pending'
(f) The selected portion is depicted with orange color depicting 'authenticity-check not possible' (i.e., subjective claim, opinion, etc.).

Additionally, the user can view the report received from the experts. In one embodiment, reports received from different experts are combined or merged together to generate a single report. An example of viewing the report is shown and explained with reference to FIG. 4D.

Figure 7A:
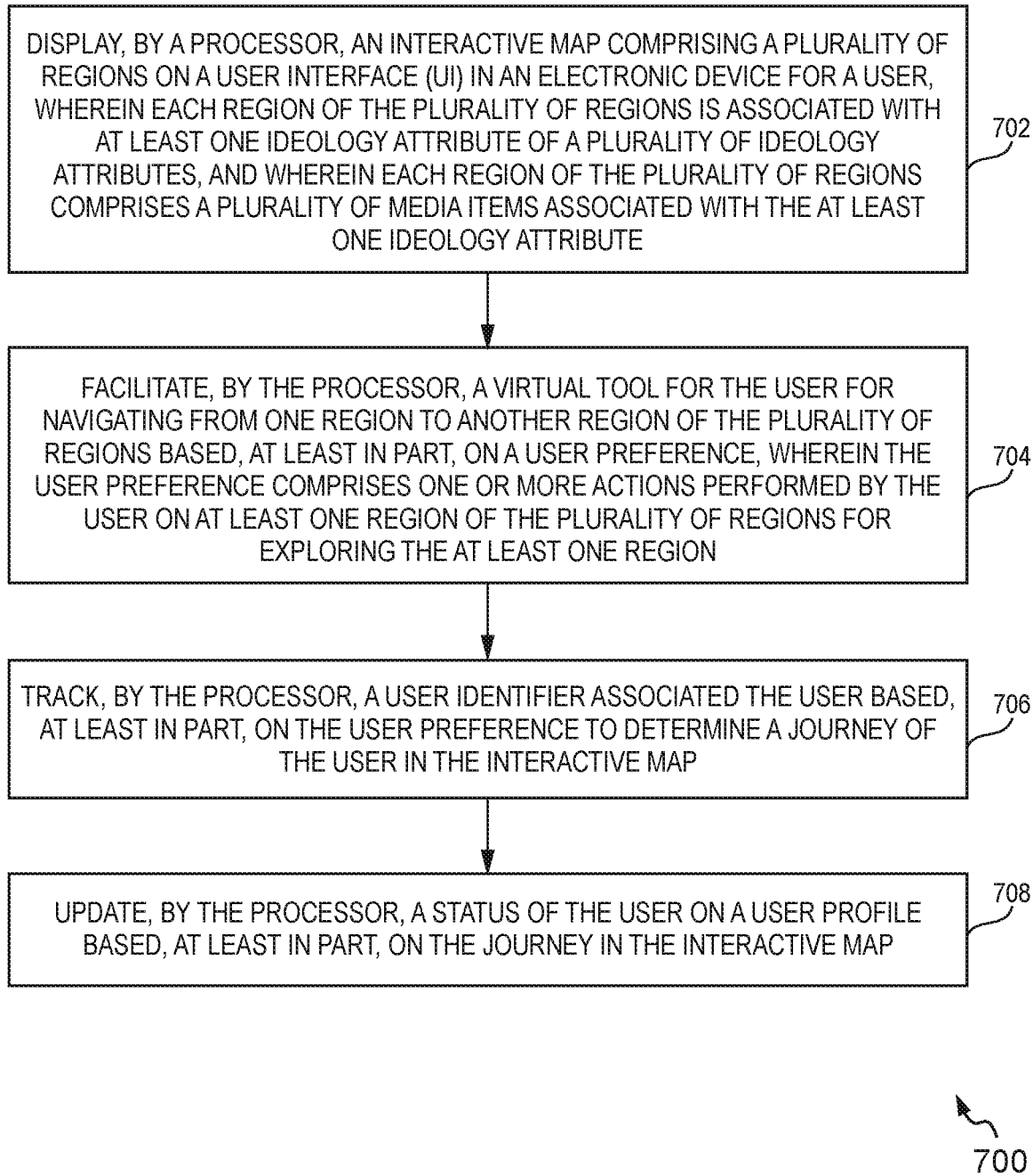
FIG. 7A represents a flow diagram of a method for exploring ideology attributes on an interactive map, in accordance with an example embodiment of the present disclosure.

FIG. 7A represents a flow diagram of a method for exploring ideology attributes on an interactive map, in accordance with an example embodiment of the present disclosure. The method 700 depicted in the flow diagram may be executed by the server system 108, the ideology exploration system 200 explained with reference to FIG. 2 or the electronic device 104 embodying the ideology exploration system 200. Operations of the flow diagram of method 700, and combinations of operation in the flow diagram, may be implemented by, for example, hardware, firmware, a processor, circuitry and/or a different device associated with the execution of software that includes one or more computer program instructions. It is noted that the operations of the method 700 can be described and/or practiced by using a system other than these systems. The method 700 starts at operation 702.

At operation 702, the method 700 includes displaying, by a processor, an interactive map comprising a plurality of regions on a User Interface (UI) in an electronic device for a user. Each region of the plurality of regions is associated with at least one ideology attribute of a plurality of ideology attributes. For instance, a main territory/region (e.g., Hinduism) includes towns, villages (i.e., smaller regions indicating Vaishnavism, Shaivism) with subsections of ideology attributes that are aligned with the ideology attribute of the main territory (i.e., Hinduism), however they may have certain principles that differentiate them from other smaller regions (i.e., ideology attributes) in the main territory. Each region of the plurality of regions comprises a plurality of media items associated with the at least one ideology attribute. Examples of media items include, but not limited to, text, images, videos, animations or any combination thereof.

At operation 704, the method 700 includes facilitating, by the processor, a virtual tool for the user for navigating from one region to another region of the plurality of regions based, at least in part, on a user preference. The user preference comprises one or more actions performed by the user on a region of the plurality of regions for exploring the region. For instance, the user 102 may provide a click/touch input on a region (e.g., Buddhism) to visit a region and this action of the user 102 is a user preference. Moreover, the user 102 may access media items, request authenticity check, participate in polls, host and manage community events, etc., by providing click/touch input on various options shown in one or more UI associated with different regions of the interactive map. These choices of the user (i.e., actions) are collectively referred to as user preference.

At operation 706, the method 700 includes tracking, by the processor, a journey of the user in the interactive map based, at least in part on, the one or more actions. The journey of the user 102 depicts the movement or choices of the user 102 on the interactive map. More specifically, the user 102 chooses to reside, explore or depart from a region associated with an ideology attribute based on the user preferences (i.e., actions) provided on the UIs of the interactive map. Accordingly, the user preferences are tracked to determine the journey of the user 102 on the map.

At operation 708, the method 700 includes updating, by the processor, a status of the user on a user profile based, at least in part, on the journey in the interactive map. The status of the user 102 can be at least one of 'staying' or 'visiting' based on the user preference.

Figure 7C:
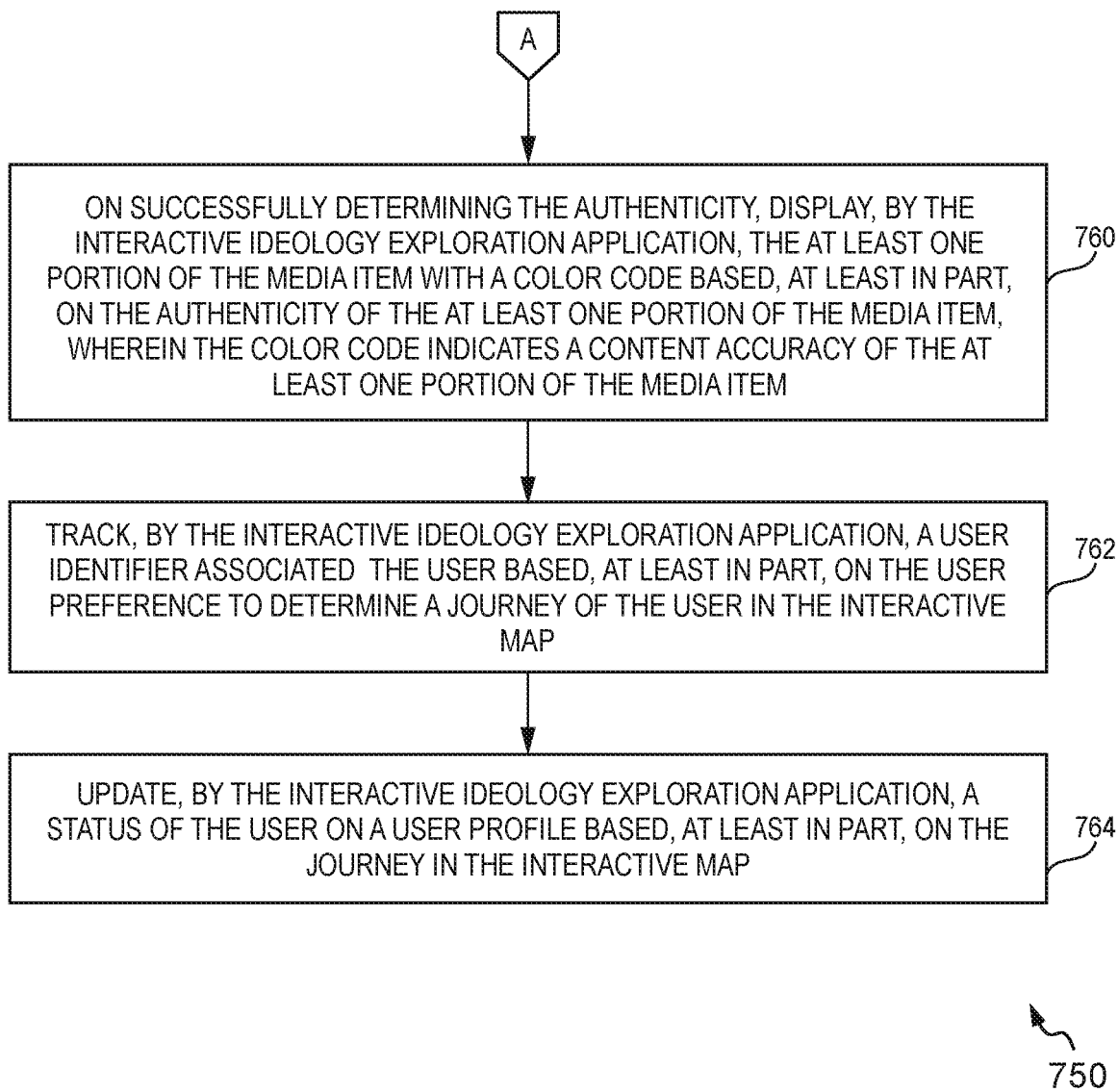

FIGS. 7B and 7C, collectively represent a flow diagram of a method 750 for exploring ideology attributes on an interactive map, in accordance with another example embodiment of the present disclosure. The method 750 depicted in the flow diagram may be executed by the server system 108, the ideology exploration system 200 explained with reference to FIG. 2 or the electronic device 104. Operations of the flow diagram of method 750, and combinations of operation in the flow diagram, may be implemented by, for example, hardware, firmware, a processor, circuitry and/or a different device associated with the execution of software that includes one or more computer program instructions. It is noted that the operations of the method 750 can be described and/or practiced by using a system other than these systems. The method 750 starts at operation 752.

At operation 752, the method 750 includes displaying an interactive map comprising a plurality of regions in an interactive ideology exploration application accessible to a user on an electronic device. Each region of the plurality of regions is associated with at least one ideology attribute of a plurality of ideology attributes. Each region of the plurality of regions includes a plurality of media items associated with the at least one ideology attribute.

At operation 754, the method 750 includes facilitating, by the interactive ideology exploration application, a virtual tool for the user for navigating from one region to another region of the plurality of regions based, at least in part, on a user preference. The user preference includes one or more actions performed by the user on at least one region of the plurality of regions for exploring the at least one region.

At operation 756, the method 750 includes facilitating selection, by the interactive ideology exploration application, of at least one portion of a media item of the plurality of media items associated with the at least one ideology in the region based at least in part on the user preference.

At operation 758, the method 750 includes receiving, by the interactive ideology exploration application, authenticity check requests from a plurality of users for determining authenticity of the at least one portion of the media item.

At operation 760, the method 750 includes on successfully determining the authenticity, displaying, by the interactive ideology exploration application, the at least one portion of the media item with a color code based, at least in part, on the authenticity of the at least one portion of the media item. The color code indicates a content accuracy of the at least one portion of the media item.

At operation 762, the method 750 includes tracking, by the ideology exploration application, a user identifier associated with the user based, at least in part, on the user preference to determine a journey of the user in the interactive map.

At operation 764, the method 750 includes updating, by the interactive ideology exploration application, a status of the user on a user profile based, at least in part, on the journey in the interactive map.

The sequence of operations of the method 700/750 need not be necessarily executed in the same order as they are presented. Further, one or more operations may be grouped together and performed in form of a single step, or one operation may have several sub-steps that may be performed in parallel or in sequential manner.

Figure 8:
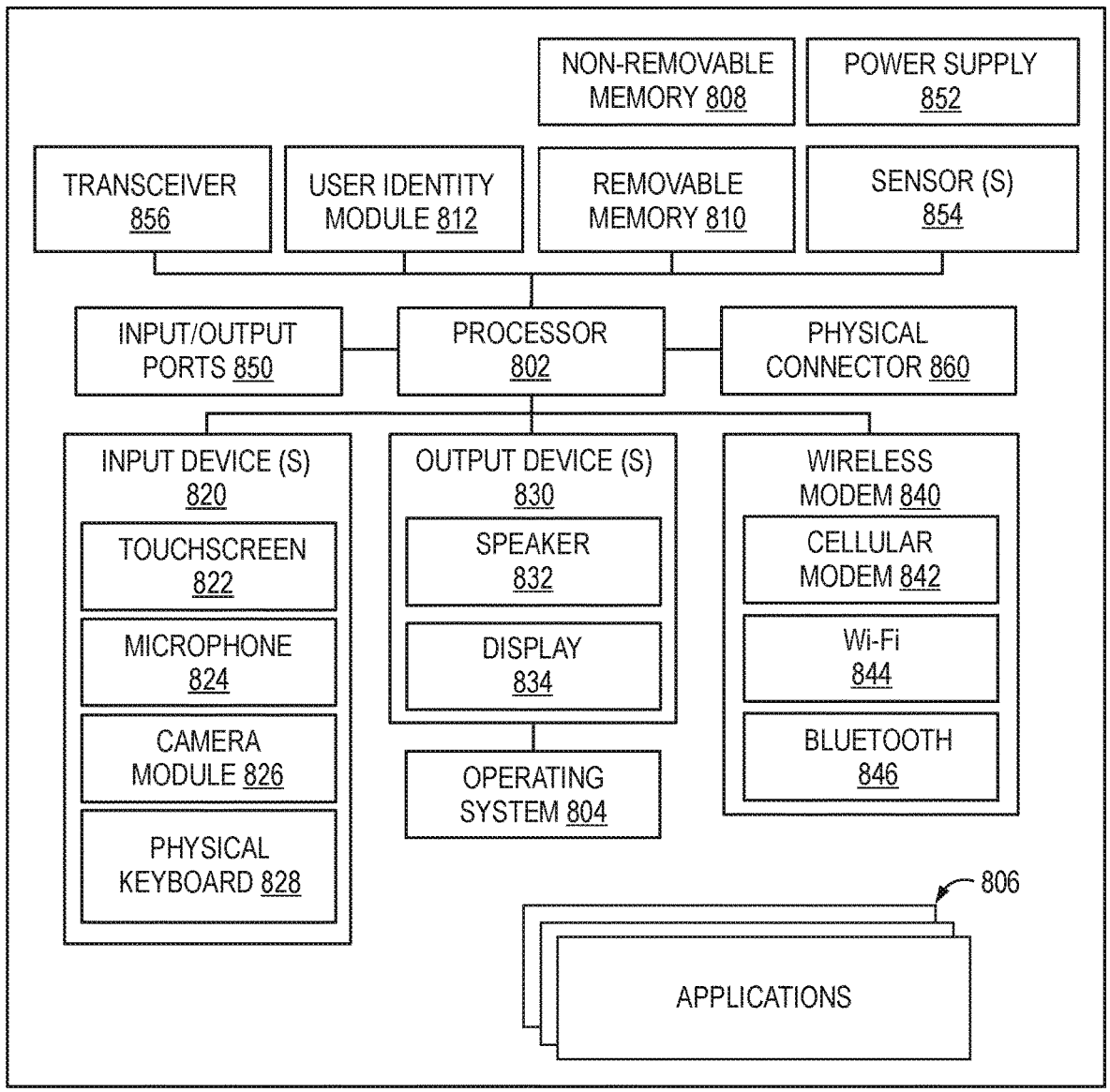
FIG. 8 shows simplified block diagram of an electronic device, for example, a mobile phone capable of implementing the various embodiments of the present disclosure.

FIG. 8 shows a simplified block diagram of an electronic device 800, for example, a mobile phone capable of implementing the various embodiments of the present disclosure. For example, the electronic device 800 may correspond to the electronic device 104 associated with the user 102 who downloads and installs the interactive ideology exploration application for exploring religious/political ideology attributes. The electronic device 800 is depicted to include one or more applications 806. The applications 806 can be an instance of an application downloaded from an application server such as, the server system 108.

It should be understood that the electronic device 800 as illustrated and hereinafter described is merely illustrative of one type of device and should not be taken to limit the scope of the embodiments. As such, it should be appreciated that at least some of the components described below in connection with the electronic device 800 may be optional and thus in an example embodiment may include more, less or different components than those described in connection with the example embodiment of the FIG. 8. As such, among other examples, the electronic device 800 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 800 includes a controller or a processor 802 (e.g., a signal processor, microprocessor, ASIC, or other control and processing logic circuitry) for performing such tasks as signal coding, data processing, image processing, input/output processing, power control, and/or other functions. An operating system 804 controls the allocation and usage of the components of the electronic device 800. In addition, the applications 806 may include common server performance monitoring applications or any other computing application.

The illustrated electronic device 800 includes one or more memory components, for example, a non-removable memory 808 and/or removable memory 810. The non-removable memory 808 and/or the removable memory 810 may be collectively known as a database in an embodiment. The non-removable memory 808 can include RAM, ROM, flash memory, a hard disk, or other well-known memory storage technologies. The removable memory 810 can include flash memory, smart cards, or a Subscriber Identity Module (SIM). The memory components can be used for storing data and/or code for running the operating system 804 and the applications 806. The electronic device 800 may further include a user identity module (UIM) 812. The UIM 812 may be a memory device having a processor built in. The UIM 812 may include, for example, a subscriber identity module (SIM), a universal integrated circuit card (UICC), a universal subscriber identity module (USIM), a removable user identity module (R-UIM), or any other smart card. The UIM 812 typically stores information elements related to a mobile subscriber. The UIM 812 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 800 can support one or more input devices 820 and one or more output devices 830. Examples of the input devices 820 may include, but are not limited to, a touch screen/a display screen 822 (e.g., capable of capturing finger tap inputs, finger gesture inputs, multi-finger tap inputs, multi-finger gesture inputs, or keystroke inputs from a virtual keyboard or keypad), a microphone 824 (e.g., capable of capturing voice input), a camera module 826 (e.g., capable of capturing still picture images and/or video images) and a physical keyboard 828. Examples of the output devices 830 may include, but are not limited to a speaker 832 and a display 834. Other possible output devices can include piezoelectric or other haptic output devices. Some devices can serve more than one input/output function. For example, the touch screen 822 and the display 834 can be combined into a single input/output device.

A wireless modem 840 can be coupled to one or more antennas (not shown in the FIG. 8) and can support two-way communications between the processor 802 and external devices, as is well understood in the art. The wireless modem 840 is shown generically and can include, for example, a cellular modem 842 for communicating at long range with the mobile communication network, a Wi-Fi compatible modem 844 for communicating at short range with an external Bluetooth-equipped device or a local wireless data network or router, and/or a Bluetooth-compatible modem 846. The wireless modem 840 is typically configured for communication with one or more cellular networks, such as a GSM network for data and voice communications within a single cellular network, between cellular networks, or between the electronic device 800 and a public switched telephone network (PSTN).

The electronic device 800 can further include one or more input/output ports 850, a power supply 852, one or more sensors 854, for example, an accelerometer, a gyroscope, a compass, or an infrared proximity sensor for detecting the orientation or motion of the electronic device 800 and biometric sensors for scanning biometric identity of an authorized user, a transceiver 856 (for wirelessly transmitting analog or digital signals) and/or a physical connector 860, which can be a USB port, IEEE 1294 (FireWire) port, and/or RS-232 port. The illustrated components are not required or all-inclusive, as any of the components shown can be deleted and other components can be added.

Without in any way limiting the scope, interpretation, or application of the claims appearing below, a technical effect of one or more of the example embodiments disclosed herein is to provide an interactive map for exploring ideologies. Various embodiments provide interactive methods and systems for exploring ideology attributes. With unprecedented amount of information provided by web browsers, the interactive method proposes an effective method to validate factuality, challenge claims, and weigh public agreement on them using the interactive map. Moreover, the interactive map provides a structured platform for the user to browse and explore different ideology attributes. Further, a journey of the user on the interactive map can be tracked based on the user identifier. The disclosure also provides methods for users to compare, discuss and voice opinions.

The disclosed method with reference to FIGS. 7A-7B, or one or more operations of the ideology exploration system 200 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the ideology exploration system 200 and its various components such as the computer system and the database may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method for exploring ideologies, the computer-implemented method comprising:
displaying, by a processor, an interactive map comprising a plurality of regions on a User Interface (UI) in an electronic device for a user, wherein each region of the plurality of regions is associated with at least one ideology attribute of a plurality of ideology attributes, and wherein each region of the plurality of regions comprises a plurality of media items associated with the at least one ideology attribute;
wherein the interactive map is updated as users of the interactive ideology exploration application form new ideology attributes based on discussions and convictions to create additional regions on the interactive map to reside with like-minded users who work together to achieve a desirable social outcome;
wherein each region has elected representatives who manage internal affairs of the region, for example, social events and the elected representatives of a region are users with additional rights to make laws, interact with other members of the region, participate in debates, endorse events, host events, post materials, answer surveys and represent the region in various forums to explain and promote their ideology attributes and the representatives of a region are elected by an election process;
wherein the interactive map includes a common region that is independent of ideology attribute and the common region is a virtual independent square located at a center of the interactive map and serves as a place to exchange ideas from users of the interactive ideology exploration application in different subjects;
facilitating, by the processor, a virtual tool for the user for navigating from one region to another region of the plurality of regions based, at least in part, on a user preference, wherein the virtual tool is depicted as at least one form of transport to browse the interactive map and wherein the user preference comprises one or more actions performed by the user on at least one region of the plurality of regions for exploring the at least one region;
generating, by the processor, a user identifier for the user after registration as an e-pas sport;
tracking, by the processor, the user identifier associated with the user based, at least in part, on the user preference to determine a journey of the user in the interactive map;
updating, by the processor, a status of the user on a user profile including the e-passport based, at least in part, on the journey in the interactive map exploring ideology attributes, wherein the status includes but not limited to: searcher, staying, visiting or departing;
receiving, by the processor, a region request from the user, the region request includes a region specification indicating the location on the interactive map for a new region for a new doctrine or denomination of existing ideology attribute, wherein the user provides the selection by circling a portion of space on the interactive map to provide the region specification to initiate the region request and the processor is configured to verify the region request based on the plurality of endorsements prior to displaying the new region on the interactive map;
receiving, by the processor, at least one e-vote from the user to participate in surveys, wherein the user is a resident of the region and the answer to poll surveys posted by the user are void when the user departs from the region and wherein a user profile depicts the surveys the user voted for and user voted against indicating user view points in social and ethical causes;
facilitating, by the processor, a reward for the user based on number of subscribers or authenticity scores, wherein the reward includes podium certification or microphone awards;
aggregating, by the processor, authenticity check requests from multiple users for a portion of the media item;
sending, by the processor the media item it to a panel of experts in different disciplines for determining the content accuracy, thereby connecting the user to at least one expert;
receiving, by the processor, at least a part payment from the user for determining the accuracy of the media item; and
storing, by the processor, a collection fact-checked media items in a repository, wherein the user can browse through the repository and choose to use any of the fact-checked media item to author new content.

2. The computer-implemented method as claimed in claim 1, wherein tracking the user identifier comprises:

facilitating selection, by the processor, of at least one portion of a media item of the plurality of media items associated with the at least one ideology attribute in the region;

facilitating, by the processor, an option to determine authenticity of the at least one portion of the media item;

receiving, by the processor, at least one action of the one or more actions from the user for determining the authenticity of the at least one portion of the media item; and on successfully determining the authenticity, displaying, by the processor, the at least one portion of the media item with a color code based, at least in part, on the authenticity of the at least one portion of the media item, wherein the color code indicates a content accuracy of the at least one portion of the media item.

3. The computer-implemented method as claimed in claim 2, further comprising:

receiving, by the processor, authenticity check requests for the at least one portion of the media item from a plurality of users;

receiving at least a part payment, by the processor, of a payment amount from the user for determining the authenticity of the at least one portion of the media item associated with the at least one ideology attribute in the region; and sending, by the processor, the at least one portion of the media item to a plurality of experts for determining the authenticity of the at least one portion of the media item when the authenticity check requests exceed a threshold request.

4. The computer-implemented method as claimed in claim 2, wherein the color code indicates at least one of:
a false claim;
a true claim;
a controversial claim leans to be wrong;
a controversial claim leans to be true;
a fact check pending; and
a non-fact checkable claim.

5. The computer-implemented method as claimed in claim 2, wherein displaying the at least one portion of the media item with the color code comprises:

displaying, by the processor, a report based on the content accuracy of the at least one portion of the media item, wherein the report comprises supporting evidence for the color code displayed on the at least one portion of the media item.

6. The computer-implemented method as claimed in claim 5, further comprising: receiving, by the processor, a media item for an ideology attribute associated with a region of the plurality of regions from the user, wherein the media item comprises a reference to the at least one portion of the media item with the color code and the report.

7. The computer-implemented method as claimed in claim 1, further comprising:

facilitating, by the processor, receipt of at least one biometric data from the user for registration by a third-party server, wherein the third-party server is configured to:
generate a user code for the user based on the at least one biometric data; and
store the user code for authentication of the user.

8. The computer-implemented method as claimed in claim 7, further comprising: displaying, by the processor, an ethical code policy for the user prior to registration, wherein the ethical code policy defines a plurality of moral rules indicating offences and corresponding penalty for the user on violation.

9. The computer-implemented method as claimed in claim 7, further comprising:

providing, by the processor, a user identifier for the user based, at least, in part on the registration;

facilitating, by the processor, creation of the user profile for the user based, at least in part on the user identifier, wherein the user profile comprises one or more user attributes; and storing, by the processor, the user profile and the user identifier.

10. The computer-implemented method as claimed in claim 1, wherein at least one region of the plurality of regions is a central public region providing one or more virtual platforms for users associated with different ideology attributes to perform one or more of:
make speeches;
hold a banner;
call for marches; and
participate in protests.

11. The computer-implemented method as claimed in claim 1, further comprising:

receiving, by the processor, a region request from the user for creating a new region associated with a new ideology attribute, wherein the region request comprises at least a region specification, an ideology attribute information, one or more media items for the new ideology attribute, and a plurality of endorsements from a plurality of users associated with the interactive map;

verifying, by the processor, the region request based, at least in part, on the plurality of endorsements; and displaying, by the processor, the new region on the interactive map, wherein the new region displays the one or more media items for the new ideology attribute.

12. The computer-implemented method as claimed in claim 1, further comprising:

accessing, by the processor, a fact authenticity score associate with the user; determining, by the processor, if the fact authenticity score is greater than a threshold score; and on determining the fact authenticity score to be greater than the threshold score, providing, by the processor, a reward for the user of the interactive map, wherein the reward is displayed on the user profile associated with the user.

13. The computer-implemented method as claimed in claim 1, wherein the plurality of ideology attributes is associated with at least one of:
religion;
politics; and
social causes.

14. The computer-implemented method as claimed in claim 1, wherein the one or more actions performed by the user on the at least one region comprises one or more of:
hosting events;
endorsing events;
creating polls;
answering polls;
hosting debates;
participating in debates;
posting media items;
initiating authenticity check request;
posting questions;
responding to questions;
editing media items;

start a petition;
suggest a bill;
edit a proposed bill; and
criticize a proposed bill.

15. An ideology exploration system, comprising:
a communication interface;
a memory comprising executable instructions; and
a processor communicably coupled to the communication interface, the processor configured to execute the executable instructions to cause the ideology exploration system to at least:
    display an interactive map comprising a plurality of regions on a User Interface (UI) in an electronic device for a user, wherein each region of the plurality of regions is associated with at least one ideology attribute of a plurality of ideology attributes, and wherein each region of the plurality of regions comprises a plurality of media items associated with the at least one ideology attribute;
    wherein the interactive map is updated as users of the interactive ideology exploration application form new ideology attributes based on discussions and convictions to create additional regions on the interactive map to reside with like-minded users who work together to achieve a desirable social outcome;
    wherein each region has elected representatives who manage internal affairs of the region, for example, social events and the elected representatives of a region are users with additional rights to make laws, interact with other members of the region, participate in debates, endorse events, host events, post materials, answer surveys and represent the region in various forums to explain and promote their ideology attributes and the representatives of a region are elected by an election process;
    wherein the interactive map includes a common region that is independent of ideology attribute and the common region is a virtual independent square located at a centre of the interactive map and serves as a place to exchange ideas from users of the interactive ideology exploration application in different subjects;
    facilitate a virtual tool for the user for navigating from one region to another region of the plurality of regions based, at least in part, on a user preference, wherein the virtual tool is depicted as at least one form of transport to browse the interactive map and wherein the user preference comprises one or more actions performed by the user on at least one region of the plurality of regions for exploring the at least one region;
    generate a user identifier for the user after registration as an e-passport;
    track the user identifier associated with the user based, at least in part, on the user preference to determine a journey of the user in the interactive map;
    update a status of the user on a user profile including the e-passport based, at least in part, on the journey in the interactive map exploring ideology attributes, wherein the status includes but not limited to: searcher, staying, visiting or departing;
    receive a region request from the user, the region request includes a region specification indicating the location on the interactive map for a new region for a new doctrine or denomination of existing ideology attribute, wherein the user provides the selection by circling a portion of space on the interactive map to provide the region specification to initiate the region request and the processor is configured to verify the region request based on the plurality of endorsements prior to displaying the new region on the interactive map;
    receive, at least one e-vote from the user to participate in surveys, wherein the user is a resident of the region and the answer to poll surveys posted by the user are void when the user departs from the region and wherein a user profile depicts the surveys the user voted for and user voted against indicating user view points in social and ethical causes;
    facilitate, a reward for the user based on number of subscribers and authenticity scores, wherein the reward includes podium certification or microphone awards;
    aggregate authenticity check requests from multiple users for a portion of the media item;
    send the media item it to a panel of experts in different disciplines for determining the content accuracy, thereby connecting the user to at least one expert;
    receive at least a part payment from the user for determining the accuracy of the media item; and
    storing, by the processor, a collection fact-checked media items in a repository, wherein the user can browse through the repository and choose to use any of the fact-checked media item to author new content.

16. The ideology exploration system as claimed in claim 15, wherein for tracking the user identifier, the ideology exploration system is caused at least in part to:
    facilitate selection of at least one portion of a media item of the plurality of media items associated with the at least one ideology attribute in the region;
    facilitate an option to determine authenticity of the at least one portion of the media item; receive at least one action of the one or more actions from the user for determining authenticity of the at least one portion of the media item; and
    on successfully determining the authenticity, display the at least one portion of the media item with a color code based, at least in part, on the authenticity of the at least one portion of the media item, wherein the color code indicates a content accuracy of the at least one portion of the media item.

17. The ideology exploration system as claimed in claim 15, wherein the ideology exploration system is further caused at least in part to:
    receive a region request from the user for creating a new region associated with a new ideology attribute, wherein the region request comprises at least a region specification, an ideology attribute information, one or more media items for the new ideology attribute, and a plurality of endorsements from a plurality of users associated with the interactive map;
    verify the region request based, at least in part, on the plurality of endorsements; and
    display the new region on the interactive map, wherein the new region displays the one or more media items for the new ideology attribute.

18. A method for exploring ideologies, the method comprising:
    displaying an interactive map comprising a plurality of regions in an interactive ideology exploration application accessible to a user on an electronic device, wherein each region of the plurality of regions is associated with at least one ideology attribute of a plurality of ideology attributes, and wherein each region of the plurality of regions comprises a plurality of media items associated with the at least one ideology attribute;

wherein the interactive map is updated as users of the interactive ideology exploration application form new ideology attributes based on discussions and convictions to create additional regions on the interactive map to reside with like-minded users who work together to achieve a desirable social outcome;

wherein each region has elected representatives who manage internal affairs of the region, for example, social events and the elected representatives of a region are users with additional rights to make laws, interact with other members of the region, participate in debates, endorse events, host events, post materials, answer surveys and represent the region in various forums to explain and promote their ideology attributes and the representatives of a region are elected by an election process;

wherein the interactive map includes a common region that is independent of ideology attribute and the common region is a virtual independent square located at a centre of the interactive map and serves as a place to exchange ideas from users of the interactive ideology exploration application in different subjects;

facilitating, by the interactive ideology exploration application, a virtual tool for the user for navigating from one region to another region of the plurality of regions based, at least in part, on a user preference, wherein the virtual tool is depicted as at least one form of transport to browse the interactive map and wherein the user preference comprises one or more actions performed by the user on at least one region of the plurality of regions for exploring the at least one region; facilitating selection, by the interactive ideology exploration application, of at least one portion of a media item of the plurality of media items associated with the at least one ideology attribute in the region based, at least in part, on the user preference;

receiving, by the interactive ideology exploration application, authenticity check requests from a plurality of users for determining authenticity of the at least one portion of the media item;

on successfully determining the authenticity, displaying, by the interactive ideology exploration application, the at least one portion of the media item with a color code based, at least in part, on the authenticity of the at least one portion of the media item, wherein the color code indicates a content accuracy of the at least one portion of the media item;

generating a user identifier for the user after registration as an e-passport; tracking, by the interactive ideology exploration application, a user identifier associated with the user based, at least in part, on the user preference to determine a journey of the user in the interactive map;

updating, by the interactive ideology exploration application, a status of the user on a user profile including the e-passport based, at least in part, on the journey in the interactive map exploring ideology attributes, wherein the status includes but not limited to: searcher, staying, visiting or departing;

receiving, by the interactive ideology exploration application, a region request from the user, the region request includes a region specification indicating the location on the interactive map for a new region for a new doctrine or denomination of existing ideology attribute, wherein the user provides the selection by circling a portion of space on the interactive map to provide the region specification to initiate the region request and the processor is configured to verify the region request based on the plurality of endorsements prior to displaying the new region on the interactive map;

receiving, by the interactive ideology exploration application, at least one e-vote from the user to participate in surveys, wherein the user is a resident of the region and the answer to poll surveys posted by the user are void when the user departs from the region and wherein a user profile depicts the surveys the user voted for and user voted against indicating user view points in social and ethical causes;

facilitating, by the interactive ideology exploration application, a reward for the user based on number of subscribers or authenticity scores, wherein the reward includes podium certification or microphone awards;

aggregating, by the interactive ideology exploration application, authenticity check requests from multiple users for a portion of the media item;

sending, by the interactive ideology exploration application, the media item it to a panel of experts in different disciplines for determining the content accuracy, thereby connecting the user to at least one expert;

receiving, by the interactive ideology exploration application, at least a part payment from the user for determining the accuracy of the media item; and storing, by the interactive ideology exploration application, a collection fact-checked media items in a repository, wherein the user can browse through the repository and choose to use any of the fact-checked media item to author new content.

19. The method as claimed in claim 18, wherein displaying the at least one portion of the media item with a color code comprises:

displaying, by the interactive ideology exploration application, a report based on the content accuracy of the at least one portion of the media item, wherein the report comprises supporting evidence for the color code displayed on the at least one portion of the media item.

20. The method as claimed in claim 18, further comprising:

receiving, by the interactive ideology exploration application, a region request from the user associated with the interactive map for creating a new region associated with a new ideology, wherein the region request comprises at least a region specification, an ideology information, one or more media items for the new ideology and a plurality of endorsements from a plurality of users associated with the interactive map;

verifying, by the interactive ideology exploration application, the region request based, at least in part, on the plurality of endorsements; and displaying, by the interactive ideology exploration application, the new region on the interactive map, wherein the new region displays the one or more media items for the new ideology.

* * * * *